US012596368B2

(12) United States Patent

Strobel

(10) Patent No.: US 12,596,368 B2

(45) Date of Patent: Apr. 7, 2026

(54) SYSTEMS AND TECHNIQUES FOR FIELD-OF-VIEW IMPROVEMENTS IN AUTONOMOUS TRUCKING SYSTEMS

(71) Applicant: Waymo LLC, Mountain View, CA (US)

(72) Inventor: Andre Strobel, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 937 days.

(21) Appl. No.: 17/537,289

(22) Filed: Nov. 29, 2021

(65) Prior Publication Data

US 2022/0169254 A1     Jun. 2, 2022

Related U.S. Application Data

(60) Provisional application No. 63/199,005, filed on Dec. 1, 2020.

(51) Int. Cl.
B60W 30/18        (2012.01)
B60G 1/04          (2006.01)
(Continued)

(52) U.S. Cl.
CPC ............. G05D 1/0088 (2013.01); B60G 1/04 (2013.01); B60G 17/016 (2013.01); B60Q 1/30 (2013.01);
(Continued)

(58) Field of Classification Search
CPC ...... G05D 1/0088; G05D 1/81; B60G 17/016; B60G 2400/82; B60G 2401/142;
(Continued)

(56) References Cited

U.S. PATENT DOCUMENTS

| | | | |
|---|---|---|---|
| 8,781,670 B2 * | 7/2014 | Dolgov ............... | B60W 30/095 701/28 |
| 8,798,841 B1 * | 8/2014 | Nickolaou ......... | B62D 15/0265 701/28 |

(Continued)

FOREIGN PATENT DOCUMENTS

| | | |
|---|---|---|
| DE | 102012002581 A1 | 8/2013 |
| WO | 2017029775 A1 | 2/2017 |

(Continued)

OTHER PUBLICATIONS

Isele et al., "Navigating Occluded Intersections with Autonomous Vehicles Using Deep Reinforcement Learning", May 21-25, 2018, IEEE, pp. 2034-2039 (Year: 2018).*

(Continued)

*Primary Examiner* — Peter D Nolan
*Assistant Examiner* — Demetra R Smith-Stewart
(74) *Attorney, Agent, or Firm* — Lowenstein Sandler LLP

(57) ABSTRACT

Aspects and implementations of the present disclosure relate to performance and safety improvements for autonomous trucking systems, such as mitigation of blind spots in the field of view of a sensing system of an autonomous vehicle, using shielding by other vehicles in adverse weather conditions, and deploying a cooperative expansion of the sensing field of view using external sensing systems.

20 Claims, 10 Drawing Sheets

(51) Int. Cl.

| | |
|---|---|
| *B60G 17/016* | (2006.01) |
| *B60Q 1/30* | (2006.01) |
| *B60Q 1/34* | (2006.01) |
| *B60W 10/20* | (2006.01) |
| *B60W 30/14* | (2006.01) |
| *B60W 40/06* | (2012.01) |
| *B60W 40/072* | (2012.01) |
| *B60W 40/12* | (2012.01) |
| *B60W 60/00* | (2020.01) |
| *B62D 35/00* | (2006.01) |
| *G01S 13/931* | (2020.01) |
| *G01S 15/931* | (2020.01) |
| *G01S 17/931* | (2020.01) |
| *G05D 1/00* | (2006.01) |
| *G05D 1/81* | (2024.01) |
| *G09F 7/00* | (2006.01) |

(52) U.S. Cl.
CPC .............. *B60Q 1/34* (2013.01); *B60W 10/20* (2013.01); *B60W 30/143* (2013.01); *B60W 30/18163* (2013.01); *B60W 40/06* (2013.01); *B60W 40/072* (2013.01); *B60W 40/12* (2013.01); *B60W 60/001* (2020.02); *B60W 60/00182* (2020.02); *B62D 35/00* (2013.01); *G01S 13/931* (2013.01); *G01S 15/931* (2013.01); *G01S 17/931* (2020.01); *G05D 1/81* (2024.01); *G09F 7/00* (2013.01); *B60W 2300/12* (2013.01); *B60W 2420/403* (2013.01); *B60W 2420/408* (2024.01); *B60W 2420/54* (2013.01); *B60W 2510/222* (2013.01); *B60W 2555/20* (2020.02); *G01S 2013/9315* (2020.01)

(58) Field of Classification Search
CPC .......... B60G 2401/174; B60G 17/0165; B60G 17/0195; B60Q 1/04; B60Q 1/30; B60Q 1/34; B60Q 1/46; B60Q 1/52; B60Q 7/005; B60W 10/20; B60W 30/143; B60W 30/18163; B60W 40/06; B60W 40/072; B60W 40/12; B60W 60/001; B60W 60/00182; B60W 2300/12; B60W 2420/403; B60W 2420/408; B60W 2420/54; B60W 2510/222; B60W 2555/20; B60W 2300/125; B60W 2554/406; B62D 35/00; G01S 13/931; G01S 15/931; G01S 17/931; G01S 2013/9315; G01S 13/862; G01S 13/865; G01S 13/867; G01S 17/86; G09F 7/00; G01C 21/3461
See application file for complete search history.

(56) References Cited

U.S. PATENT DOCUMENTS

| | | | |
|---|---|---|---|
| 9,488,979 | B1 | 11/2016 | Chambers et al. |
| 10,078,964 | B2 | 9/2018 | Li et al. |
| 10,248,120 | B1 | 4/2019 | Siegel et al. |
| 10,486,485 | B1 | 11/2019 | Levinson et al. |
| 10,611,023 | B2 * | 4/2020 | Fong ...................... B25J 9/1697 |
| 11,420,621 | B2 * | 8/2022 | Ghose .............. B60W 60/0015 |
| 11,747,828 | B2 | 9/2023 | Urano et al. |
| 2012/0101680 | A1 * | 4/2012 | Trepagnier .............. G01S 17/86 701/25 |
| 2018/0015801 | A1 | 1/2018 | Mohamed et al. |
| 2018/0218226 | A1 | 8/2018 | Wellington et al. |
| 2018/0259966 | A1 * | 9/2018 | Long ..................... B60W 50/02 |
| 2019/0061780 | A1 | 2/2019 | Han et al. |
| 2019/0079539 | A1 | 3/2019 | Sridhar et al. |
| 2019/0086549 | A1 * | 3/2019 | Ushani ................. G05D 1/0088 |
| 2019/0114921 | A1 * | 4/2019 | Cazzoli .................. G06V 20/58 |
| 2019/0145053 | A1 | 5/2019 | Sninchak |
| 2019/0283757 | A1 * | 9/2019 | Honda ................. G05D 1/0088 |
| 2019/0286153 | A1 * | 9/2019 | Rankawat .............. G05D 1/227 |
| 2019/0333390 | A1 | 10/2019 | Woodrow et al. |
| 2020/0056895 | A1 | 2/2020 | Nagy et al. |
| 2020/0103523 | A1 * | 4/2020 | Liu .......................... G01S 13/87 |
| 2020/0130711 | A1 | 4/2020 | Turek et al. |
| 2020/0278681 | A1 * | 9/2020 | Gier ....................... G06V 20/56 |
| 2020/0307566 | A1 * | 10/2020 | Ghose ............. B60W 30/18163 |
| 2020/0307567 | A1 * | 10/2020 | Ghose .................... G08G 1/167 |
| 2020/0324778 | A1 | 10/2020 | Diamond et al. |
| 2020/0384980 | A1 | 12/2020 | Yu et al. |
| 2021/0271249 | A1 * | 9/2021 | Kobashi .......... B60W 60/00272 |
| 2021/0272018 | A1 | 9/2021 | Casas et al. |
| 2022/0105772 | A1 | 4/2022 | Kim et al. |
| 2022/0281456 | A1 | 9/2022 | Giovanardi et al. |
| 2022/0340122 | A1 | 10/2022 | Diamond et al. |
| 2022/0355819 | A1 | 11/2022 | Yu et al. |
| 2022/0363102 | A1 | 11/2022 | Min |
| 2022/0363289 | A1 | 11/2022 | Nehmadi et al. |
| 2022/0388363 | A1 | 12/2022 | Zhang et al. |
| 2023/0184563 | A1 | 6/2023 | Arreaza et al. |

FOREIGN PATENT DOCUMENTS

| | | | |
|---|---|---|---|
| WO | 2019220235 | A1 | 11/2019 |
| WO | 2021121583 | A1 | 6/2021 |

OTHER PUBLICATIONS

Suleymanov et al., "LiDAR Lateral Localisation Despite Challenging Occlusion from Traffic", Apr. 20-23, 2020, IEEE, pp. 334-341. (Year: 2020).*

* cited by examiner

500

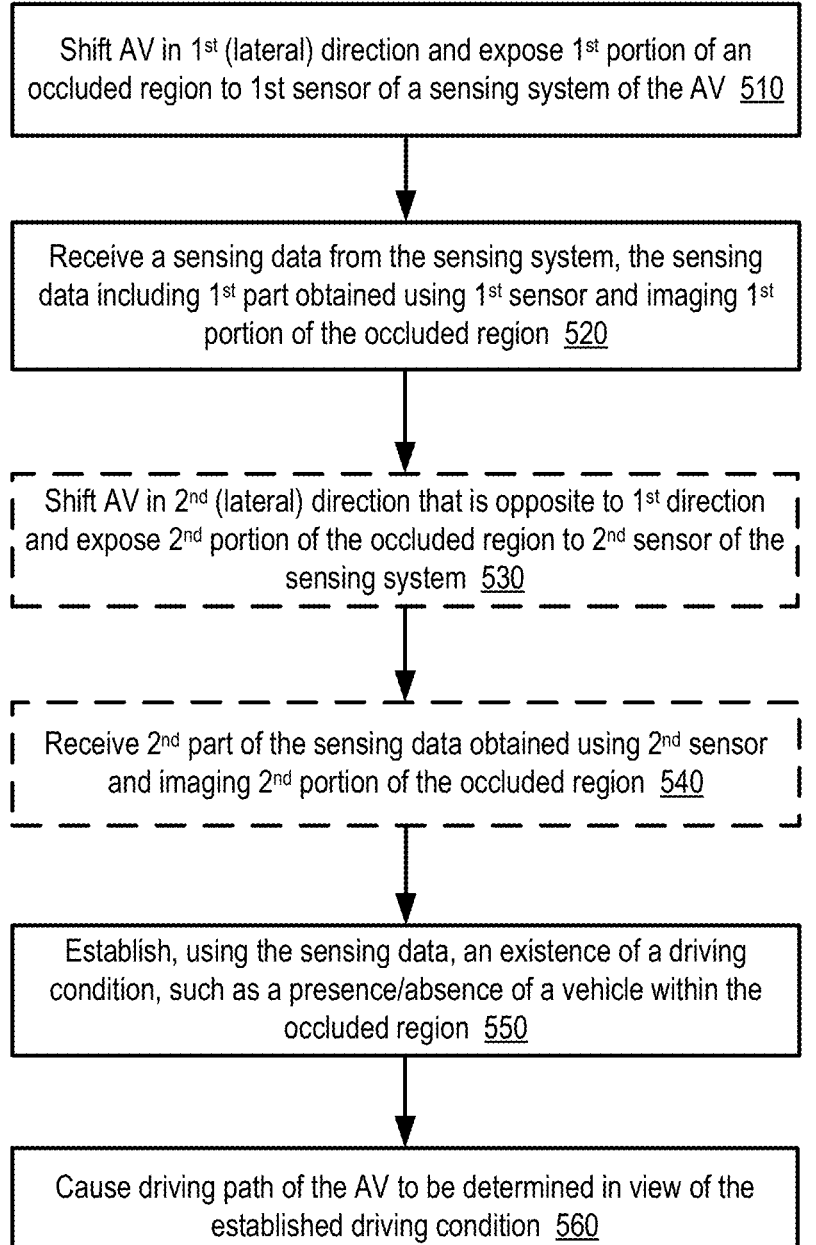

Shift AV in 1st (lateral) direction and expose 1st portion of an occluded region to 1st sensor of a sensing system of the AV  510

Receive a sensing data from the sensing system, the sensing data including 1st part obtained using 1st sensor and imaging 1st portion of the occluded region  520

Shift AV in 2nd (lateral) direction that is opposite to 1st direction and expose 2nd portion of the occluded region to 2nd sensor of the sensing system  530

Receive 2nd part of the sensing data obtained using 2nd sensor and imaging 2nd portion of the occluded region  540

Establish, using the sensing data, an existence of a driving condition, such as a presence/absence of a vehicle within the occluded region  550

Cause driving path of the AV to be determined in view of the established driving condition  560

FIG. 5

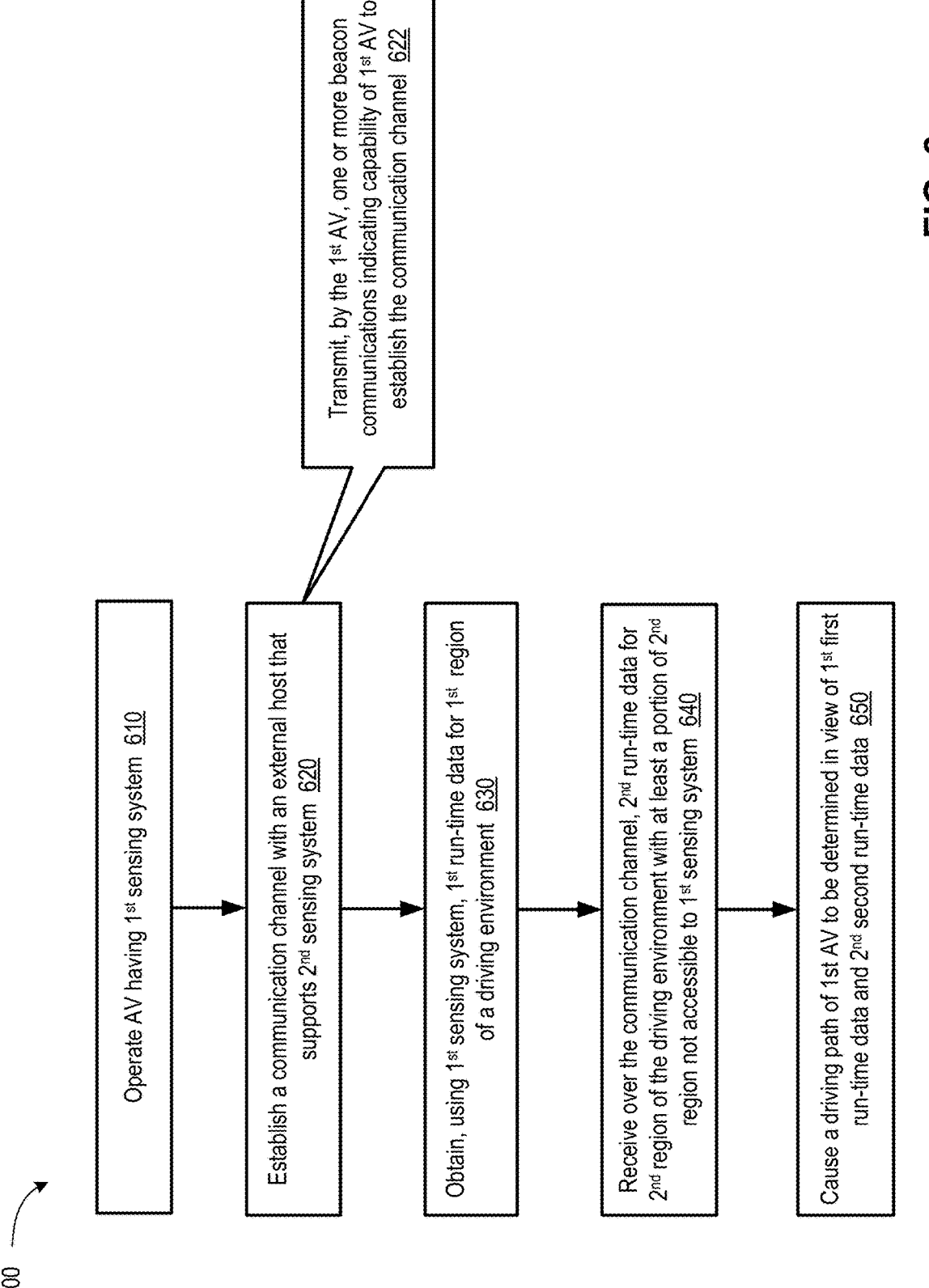

Transmit, by the 1st AV, one or more beacon communications indicating capability of 1st AV to establish the communication channel  622

Operate AV having 1st sensing system  610

Establish a communication channel with an external host that supports 2nd sensing system  620

Obtain, using 1st sensing system, 1st run-time data for 1st region of a driving environment  630

Receive over the communication channel, 2nd run-time data for 2nd region of the driving environment with at least a portion of 2nd region not accessible to 1st sensing system  640

Cause a driving path of 1st AV to be determined in view of 1st first run-time data and 2nd second run-time data  650

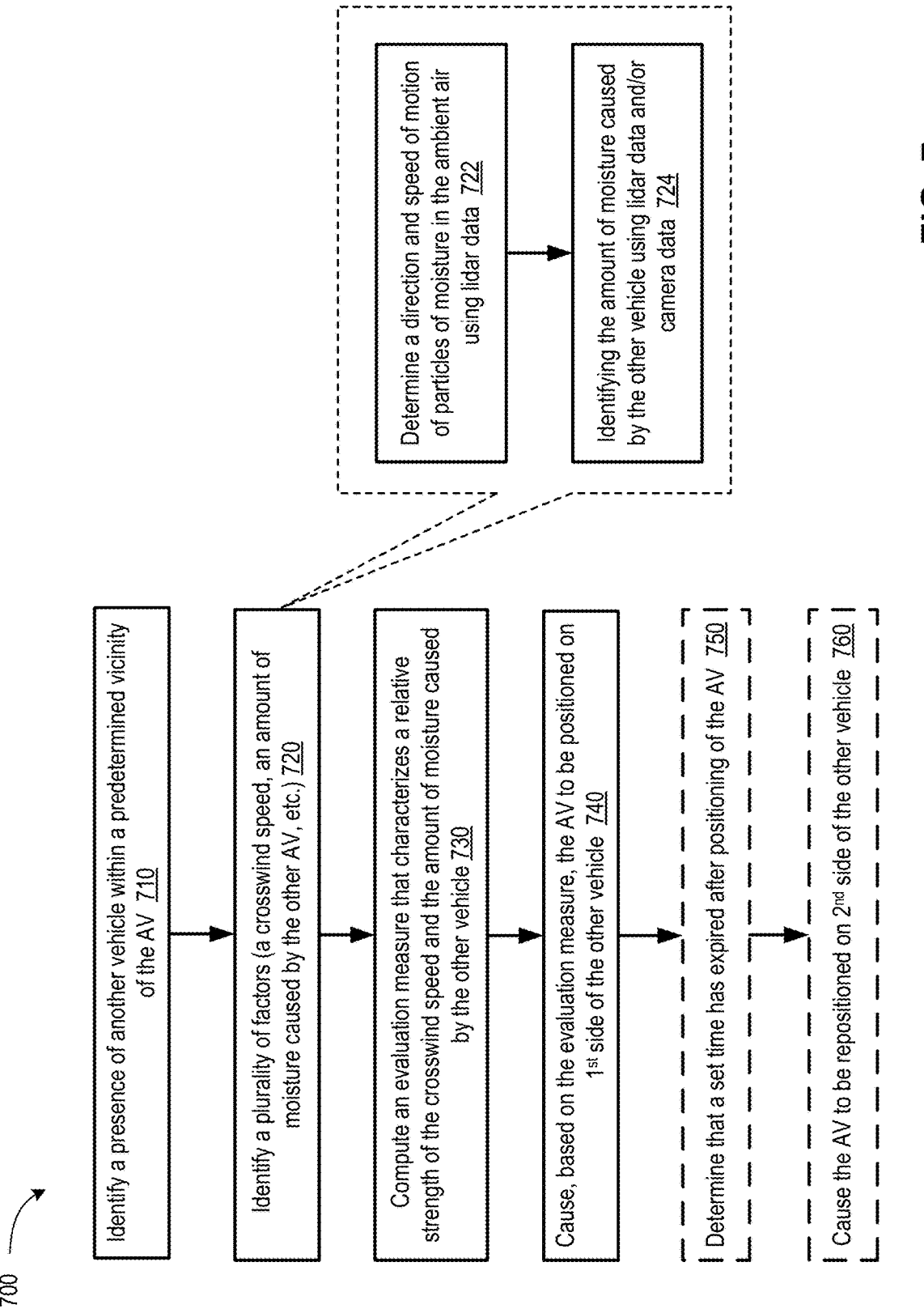

700

Identify a presence of another vehicle within a predetermined vicinity of the AV 710

Identify a plurality of factors (a crosswind speed, an amount of moisture caused by the other AV, etc.) 720

Compute an evaluation measure that characterizes a relative strength of the crosswind speed and the amount of moisture caused by the other vehicle 730

Cause, based on the evaluation measure, the AV to be positioned on 1st side of the other vehicle 740

Determine that a set time has expired after positioning of the AV 750

Cause the AV to be repositioned on 2nd side of the other vehicle 760

Determine a direction and speed of motion of particles of moisture in the ambient air using lidar data 722

Identifying the amount of moisture caused by the other vehicle using lidar data and/or camera data 724

FIG. 7

SYSTEMS AND TECHNIQUES FOR FIELD-OF-VIEW IMPROVEMENTS IN AUTONOMOUS TRUCKING SYSTEMS

RELATED APPLICATIONS

This application claims the benefit of U.S. Provisional Application No. 63/199,005, filed Dec. 1, 2020, the entire contents of which is being incorporated herein by reference.

TECHNICAL FIELD

The instant specification generally relates to autonomous vehicles. More specifically, the instant specification relates to performance and safety improvements for autonomous trucking systems, such as blind spot mitigation, vehicle shielding in severe weather conditions, and cooperative expansion of the sensing fields of view.

BACKGROUND

An autonomous vehicle operates by sensing an outside environment with various sensors and charting a driving path through the environment based on the sensed data, Global Positioning System (GPS) data, and road map data. Among the autonomous vehicles are trucks used for long-distance load deliveries. Trucking industry is sensitive to various operational costs and fuel costs, in particular. Autonomous trucks have to meet high standards of safety, which can include both the standards common for all vehicles (driver-operated and autonomously driven alike) as well as additional standards specific for autonomous trucks. Various solutions that improve fuel efficiency, performance, and safety have to be designed without reliance on visual perception, driving experience, and decision-making abilities of a human operator.

BRIEF DESCRIPTION OF THE DRAWINGS

The present disclosure is illustrated by way of examples, and not by way of limitation, and can be more fully understood with references to the following detailed description when considered in connection with the figures, in which:

FIG. 5 depicts a flow diagram of an example method of blind spot mitigation during autonomous trucking missions by an ADT, in accordance with some implementations of the present disclosure.

FIG. 6 depicts a flow diagram of an example method of an expansion of a field of view of an autonomously driven truck that uses cooperation with another vehicle or a stationary sensing system, in accordance with some implementations of the present disclosure.

FIG. 7 depicts a flow diagram of an example method of vehicle shielding of autonomously driven trucks in unfavorable driving conditions, in accordance with some implementations of the present disclosure.

SUMMARY

Figure 1A:
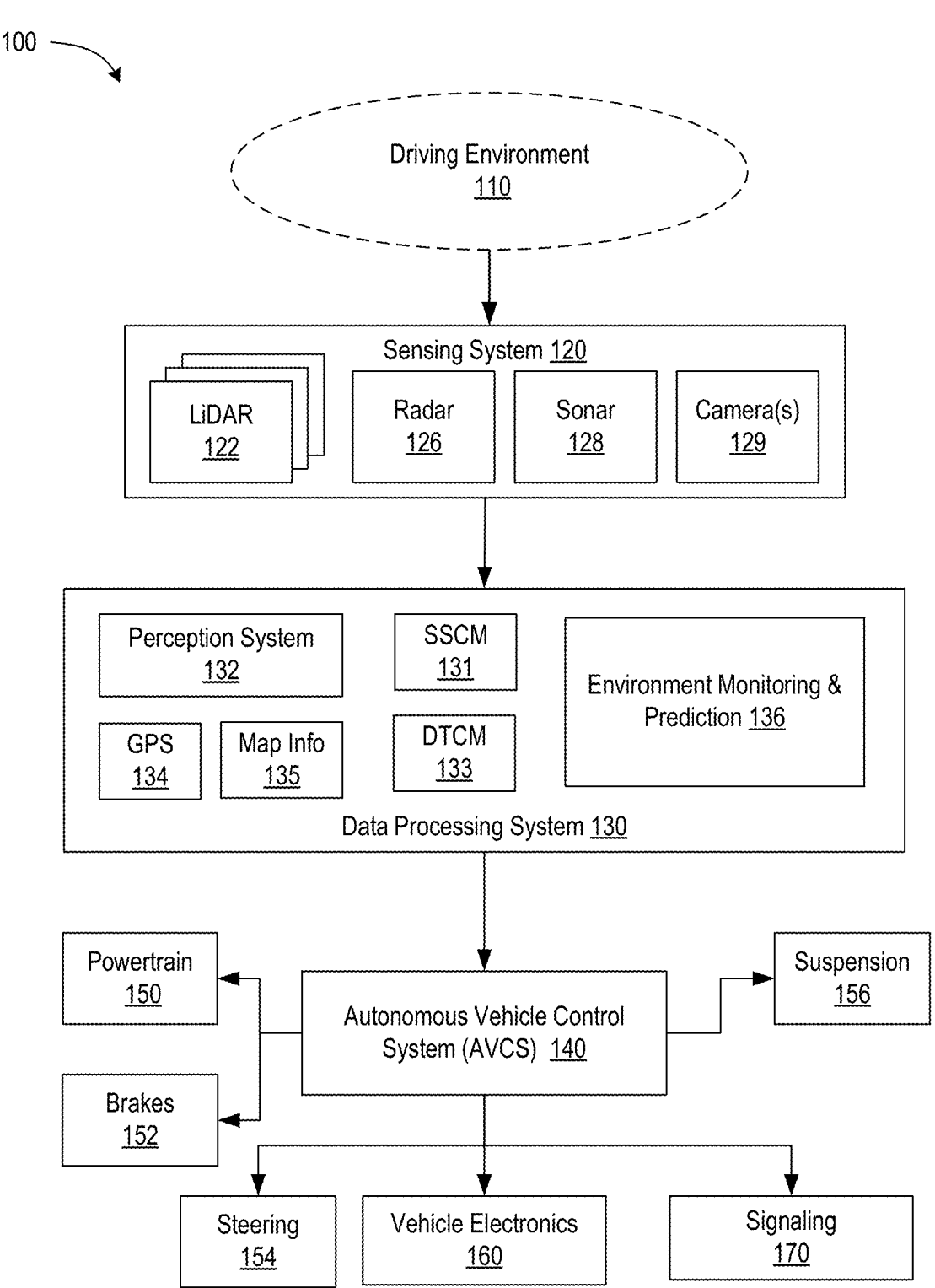
FIG. 1A is a diagram illustrating components of an example autonomous vehicle, such as an autonomously driven truck, that uses sensing and perception technology to support autonomous driving operations, in accordance with some implementations of the present disclosure.

In one implementation, disclosed is a method to operate a traveling autonomous vehicle (AV), including: shifting, using an AV control system, the AV in a first direction that is lateral to a direction of motion of the AV and expose a first portion of an occluded, by the AV, region of an environment of the AV to a first sensor of a sensing system of the AV; receiving, by a data processing system of the AV, a sensing data from the sensing system, wherein the sensing data comprises a first part obtained using the first sensor and imaging the first portion of the occluded region; establishing, by the data processing system of the AV and using the received sensing data, an existence of a driving condition, wherein the driving condition comprises one of: a presence of a vehicle within the occluded region of the environment of the AV, or an absence of a vehicle within the occluded region of the environment of the AV; and causing, by the data processing system of the AV, a driving path of the AV to be determined in view of the established driving condition.

In another implementation, disclosed is a method to operate a first autonomous vehicle (AV) having a first sensing system, the method including: establishing a communication channel with an external host having access to an information obtained by a second sensing system; obtaining, using a first sensing system, a first run-time data for a first region of a driving environment of the first AV; receiving, by a data processing system of the first AV, over the communication channel, a second run-time data for a second region of the driving environment of the first AV, wherein at least a portion of the second region is not accessible to the first sensing system; and causing, by the data processing system of the first AV, a driving path of the first AV to be determined in view of the first run-time data and the second run-time data.

In another implementation, disclosed is a method to operate a first vehicle, wherein the first vehicle is an autonomous vehicle (AV), the method including identifying, by a data processing system of the AV, a presence of a second vehicle within a predetermined vicinity of the first vehicle; identifying, by a data processing system of the first vehicle, a plurality of factors comprising: a crosswind speed, and an amount of moisture in an ambient air caused by the second vehicle; computing, by the data processing system of the first vehicle, an evaluation measure that characterizes a relative strength of the crosswind speed and the amount of moisture in the ambient air caused by the second vehicle;

and causing, by the data processing system of the first vehicle and based on the evaluation measure, the AV to be positioned on a first side of the second vehicle, wherein the first side is one of: an upwind side of the second vehicle, or a downwind side of the second vehicle.

DETAILED DESCRIPTION

Autonomously driven trucks (ADTs) are large vehicles capable of delivering one or more cargo trailers to various destinations reachable by highways, city streets, rural roads, and the like. Computer vision of ADTs is facilitated by a sensing system that can include light detection and ranging devices (lidars), radar detection and ranging devices, cameras, sonars, various positioning systems, and so on. Safety and efficiency of trucking operations depend on timeliness, accuracy, and completeness of the sensing data. ADTs, however, often have blind spots (e.g., behind the trailer load) that are not easily accessible to the sensing system. Such blind spots can hide vehicles whose identification is often conductive to safe ADT driving. Additionally, in some instances, sensors of the sensing system (e.g., lidars and cameras) can have a reduced visibility in adverse weather conditions, being affected by mist and spray of moisture lifted by rotating tires and the flow of air from other vehicles.

Aspects and implementations of the present disclosure address these and other shortcomings of the existing technologies by enabling techniques of improving the field-of-view of the sensing system as well as techniques of shielding sensors during adverse weather conditions. In particular, described are techniques and systems for nudging ADTs across driving lanes for blind spot mitigation, in order to allow the ADT sensors to acquire an expanded view into at least portions of the blind spot. Additionally, described are techniques and systems for sharing sensing data with other vehicles as well as receiving sensing data from stationary sensing hubs positioned at strategic locations (e.g., within or near parking/loading areas, on hilltops or near mountain passes, and so on). Further described are techniques and systems for evaluating weather conditions and deciding whether to position an ADT downwind (e.g., for protection against wind's mechanical impact) from other vehicles or upwind (e.g., for protection against mist/spray) from other vehicles. In some instances, the ADT can be positioned at other locations in relation to the shielding vehicles, e.g., with the lidar sensors of the ADT positioned forward of most of the tires of the shielding vehicle(s), to minimise spray from the shielding vehicle's tires. For example, the ADT can maintain its position relative to the shielding vehicle such that the lidars of the ADT (e.g., located on or in place of the rearview mirrors) can be aligned with or slightly ahead of the front axle of the shielding vehicle. (Additionally, the ADT can be positioned on the upwind side of the shielding vehicle). Regions shielded through other vehicles can also be used as a position giving protection from mist/spray. The advantages of the disclosed implementations include, but are not limited to, improved safety and efficiency of trucking operations by expanding and protecting a field of view of the ADT sensors.

FIG. 1A is a diagram illustrating components of an example autonomous vehicle, such as an autonomously driven truck 100, that uses sensing and perception technology to support autonomous driving operations, in accordance with some implementations of the present disclosure. Although subsequent references are made to autonomously driven trucks (ADT), aspects and implementations of the present disclosure should be understood to apply to other autonomous motorized vehicles, such as cars, buses, motorcycles, all-terrain vehicles, recreational vehicles, any specialized farming or construction vehicles, sidewalk delivery robotic vehicles, and the like, or any other vehicles capable of being operated in a autonomously driven mode (without a human input or with a reduced human input).

For brevity and conciseness, various systems and methods are described below in conjunction with autonomous vehicles, but similar techniques can be used in various driver assistance systems that do not rise to the level of fully autonomous driving systems. More specifically, disclosed techniques can be used in Society of Automotive Engineers (SAE) Level 2 driver assistance systems that implement steering, braking, acceleration, lane centering, adaptive cruise control, etc., as well as other driver support. The disclosed techniques can be used in SAE Level 3 driving assistance systems capable of autonomous driving under limited (e.g., highway) conditions. Likewise, the disclosed techniques can be used in vehicles that use SAE Level 4 self-driving systems that operate autonomously under most regular driving situations and require only occasional attention of the human operator. In such systems, techniques for field-of-view improvements can be used automatically without a driver input or with a reduced driver control and result in improved overall safety and efficiency of autonomous, semi-autonomous, and driver assistance systems.

A driving environment 110 can include any objects (animated or non-animated) located outside the ADT, such as roadways, buildings, trees, bushes, sidewalks, bridges, mountains, other vehicles, pedestrians, and so on. The driving environment 110 can be urban, suburban, rural, highway and so on. In some implementations, the driving environment 110 can be an off-road environment (e.g. farming or agricultural land). In some implementations, the driving environment can be an indoor environment, e.g., the environment of an industrial plant, a shipping warehouse, a hazardous area of a building, and so on. In some implementations, the driving environment 110 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 110 can be located at any distance from the autonomous vehicle, from close distances of several feet (or less) to several miles (or more).

The example ADT 100 can include a sensing system 120. The sensing system 120 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye, the UV range, the infrared range, the radio frequency range, etc.

The sensing system 120 can include a radar unit 126, which can be any system that utilizes radio or microwave frequency signals to sense objects within driving environment 110 of ADT 100. The radar unit 126 can be configured to sense both the spatial locations of the objects (including their spatial dimensions) and their velocities (e.g., using the Doppler shift technology).

The sensing system 120 can include one or more LiDAR sensors 122 (e.g., LiDAR rangefinders), which can be a laser-based unit capable of determining distances to the objects in driving environment 110, e.g., using time-of-flight (ToF) technology. The LiDAR sensor(s) 122 can utilize wavelengths of electromagnetic waves that are shorter than the wavelengths of the radio waves and can, therefore, provide a higher spatial resolution and sensitivity compared with the radar unit 126. The LiDAR sensor(s) 122 can include a coherent LiDAR sensor, such as a frequency-modulated continuous-wave (FMCW) LiDAR sensor. The LiDAR sensor(s) 122 can use optical heterodyne detection for velocity determination. In some implementations, the functionality of a ToF and coherent LiDAR sensor(s) is combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple LiDAR sensor(s) 122 can be mounted on ADT, e.g., at different locations separated in space, to provide additional information about transverse components of the velocity of the reflecting object.

LiDAR sensor(s) 122 can include one or more laser sources producing and emitting signals and one or more detectors of the signals reflected back from the objects. LiDAR sensor(s) 122 can include spectral filters to filter out spurious electromagnetic waves having wavelengths (frequencies) that are different from the wavelengths (frequencies) of the emitted signals. In some implementations, LiDAR sensor(s) 122 can include directional filters (e.g., apertures, diffraction gratings, and so on) to filter out electromagnetic waves that can arrive at the detectors along directions different from the directions of the emitted signals. LiDAR sensor(s) 122 can use various other optical components (lenses, mirrors, gratings, optical films, interferometers, spectrometers, local oscillators, and the like) to enhance sensing capabilities of the sensors.

In some implementations, LiDAR sensor(s) 122 can scan a full 360-degree view within a horizontal plane. In some implementations, LiDAR sensor 122 can be capable of spatial scanning along both the horizontal and vertical directions. In some implementations, the field of view can be up to 90 degrees in the vertical direction (e.g., with at least a part of the region above the horizon being scanned by the LiDAR signals). In some implementations, the field of view can be a full hemisphere. For brevity and conciseness, when a reference to "LiDAR technology," "LiDAR sensing," "LiDAR data," and "LiDAR," in general, is made in the present disclosure, such a reference shall be understood also to encompass other sensing technology that operate at generally in the near-infrared wavelength, but may include sensing technology that operate at other wavelengths.

The sensing system 120 can further include one or more cameras 129 to capture images of the driving environment 110. The images can be two-dimensional projections of the driving environment 110 (or parts of the driving environment 110) onto a projecting plane (flat or non-flat, e.g. fisheye) of the cameras. Some of the cameras 129 of the sensing system 120 can be video cameras configured to capture a continuous (or quasi-continuous) stream of images of the driving environment 110. The sensing system 120 can also include one or more sonars 128, which can be ultrasonic sonars, in some implementations.

The sensing data obtained by the sensing system 120 can be processed by a data processing system 130 of ADT 100. For example, the data processing system 130 can include a perception system 132. The perception system 132 can be configured to detect and track objects in the driving environment 110 and to recognize the detected objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the LiDAR sensing data (coherent Doppler data and incoherent ToF data) to determine distances to various objects in the environment 110 and velocities (radial and, in some implementations, transverse) of such objects. In some implementations, the perception system 132 can use the LiDAR data in combination with the data captured by the camera(s) 129. In one example, the camera(s) 129 can detect an image of a rock partially obstructing a traffic lane. Using the data from the camera(s) 129, the perception system 132 can be capable of determining the angular size of the rock, but not the linear size of the rock. Using the LiDAR data, the perception system 132 can determine the distance from the rock to the ADT and, therefore, by combining the distance information with the angular size of the rock, the perception system 132 can determine the linear dimensions of the rock as well.

In another implementation, using the LiDAR data, the perception system 132 can determine how far a detected object is from the ADT and can further determine the component of the object's velocity along the direction of the ADT's motion. Furthermore, using a series of quick images obtained by the camera, the perception system 132 can also determine the lateral velocity of the detected object in a direction perpendicular to the direction of the ADT's motion. In some implementations, the lateral velocity can be determined from the LiDAR data alone, for example, by recognizing an edge of the object (using horizontal scanning) and further determining how quickly the edge of the object is moving in the lateral direction. Each of the sensor frames can include multiple points. Each point can correspond to a reflecting surface from which a signal emitted by the sensing system 120 (e.g., by LiDAR sensor(s) 122, etc.) is reflected. The type and/or nature of the reflecting surface can be unknown. Each point can be associated with various data, such as a timestamp of the frame, coordinates of the reflecting surface, radial velocity of the reflecting surface, intensity of the reflected signal, and so on. The coordinates can be spherical (or cylindrical) coordinates, in one implementation. For example, the coordinates can include the radial distance, the polar angle (the angle the direction to the respective reflecting surface makes with the vertical direction or a horizontal plane), and the azimuthal angle (the angle indicating the direction within the horizontal plane). The radial distance can be determined from the LiDAR data whereas the angles can be independently known from a synchronizer data, a clock data, e.g., based on the known scanning frequency within the horizontal plane.

The perception system 132 can further receive information from a GPS transceiver (not shown) configured to obtain information about the position of the ADT relative to Earth. The GPS data processing module 134 can use the GPS data in conjunction with the sensing data to help accurately determine location of the ADT with respect to fixed objects of the driving environment 110, such as roadways, lane boundaries, intersections, sidewalks, crosswalks, road signs, surrounding buildings, and so on, locations of which can be provided by map information 135. In some implementations, other (than GPS) measurement units (e.g., inertial measurement units, speedometers, accelerometers, etc.) can also be used (alone or in conjunction with GPS) for identification of locations of the ADT relative to Earth. Additional tools to enable identification of locations can include various mapping algorithms based on data obtained by the perception system 132, which can be used (together with or separately from) map info 135. In some implementations, the data processing system 130 can receive non-electromagnetic data, such as sonar data (e.g., ultrasonic sensor data), temperature sensor data, pressure sensor data, meteorological data (e.g., wind speed and direction, precipitation data), and the like.

The data processing system 130 can include a sensing system coordination module (SSCM) 131 to coordinate exchange of sensing data with other vehicles or outside sensors, as described in more detail below. The data processing system 130 can further include a driving trajectory control module (DTCM) 133 to implement waiting loop and blind spot mitigation, as described in more detail below.

The data processing system 130 can further include an environment monitoring and prediction component 136, which can monitor how the driving environment 110 evolves with time, e.g., by keeping track of the locations and velocities of the animated objects (relative to Earth). In some implementations, the environment monitoring and prediction component 136 can keep track of the changing appearance of the environment due to motion of the ADT relative to the environment. In some implementations, the environment monitoring and prediction component 136 can make predictions about how various animated objects of the driving environment 110 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 136 can conclude that object 1 is resuming its motion from a stop sign or a red traffic light signal. Accordingly, the environment monitoring and prediction component 136 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 136 can conclude that object 2 is stopping at a stop sign or at a red traffic light signal. Accordingly, the environment monitoring and prediction component 136 can predict where object 2 is likely to be within the next 1 or 3 seconds. The environment monitoring and prediction component 136 can perform periodic checks of the accuracy of its predictions and modify the predictions based on new data obtained from the sensing system 120.

The data generated by the perception system 132, the GPS data processing module 134, and the environment monitoring and prediction component 136 can be used by an autonomous driving system, such as autonomous vehicle control system (AVCS) 140. The AVCS 140 can include one or more algorithms that control how the ADT is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the ADT. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain 150, brakes 152, steering 154 vehicle electronics 160, suspension 156, signaling 170, and other systems and components not explicitly shown in FIG. 1A. The powertrain 150 can include an engine (internal combustion engine, electric engine, and so on), transmission, differentials, axles, and wheels. The vehicle electronics 160 can include an on-board computer, engine management, ignition, communication systems, carputers, telematics, in-car entertainment systems, and other systems and components. The signaling 170 can include high and low headlights, stopping lights, turning and backing lights, marker lights and other lights used to signal to other road users as well as horns and alarms, inside lighting system, dashboard notification system, passenger notification system, radio and wireless network transmission systems, and so on. Some of the instructions output by the AVCS 140 can be delivered directly to the powertrain 150, brakes 152, steering 154, signaling 170, etc., whereas other instructions output by the AVCS 140 are first delivered to the vehicle electronics 160, which generate commands to the other components of the vehicle.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain 150, brakes 152, and steering 154 (directly or via the vehicle electronics 160) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain 150, brakes 152, and steering 154 to resume the previous speed settings of the vehicle.

Figure 1B:
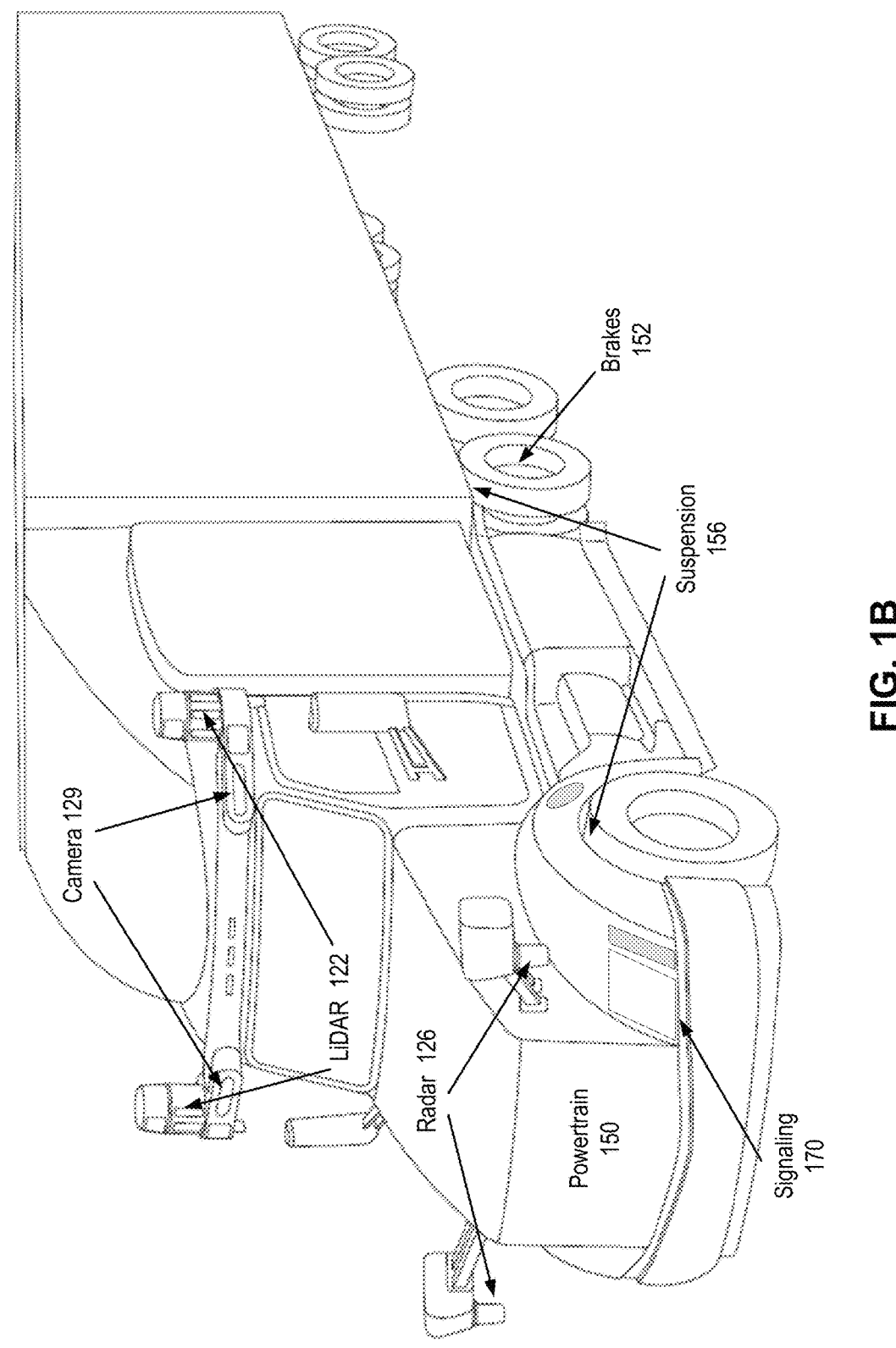
FIG. 1B is a schematic depiction of an autonomously driven truck capable of performing one or more described techniques, in accordance with implementations of the present disclosure.

FIG. 1B is a schematic depiction of an autonomously driven truck 102 capable of performing one or more described techniques, in accordance with implementations of the present disclosure. Depicted schematically are some of the systems of the autonomously driven truck 102, such as lidar(s) 122, radar(s) 126, camera(s) 129, powertrain 150, brakes 152, suspension 156, signaling 170. Numerous other systems are not indicated, for conciseness.

Figure 2:
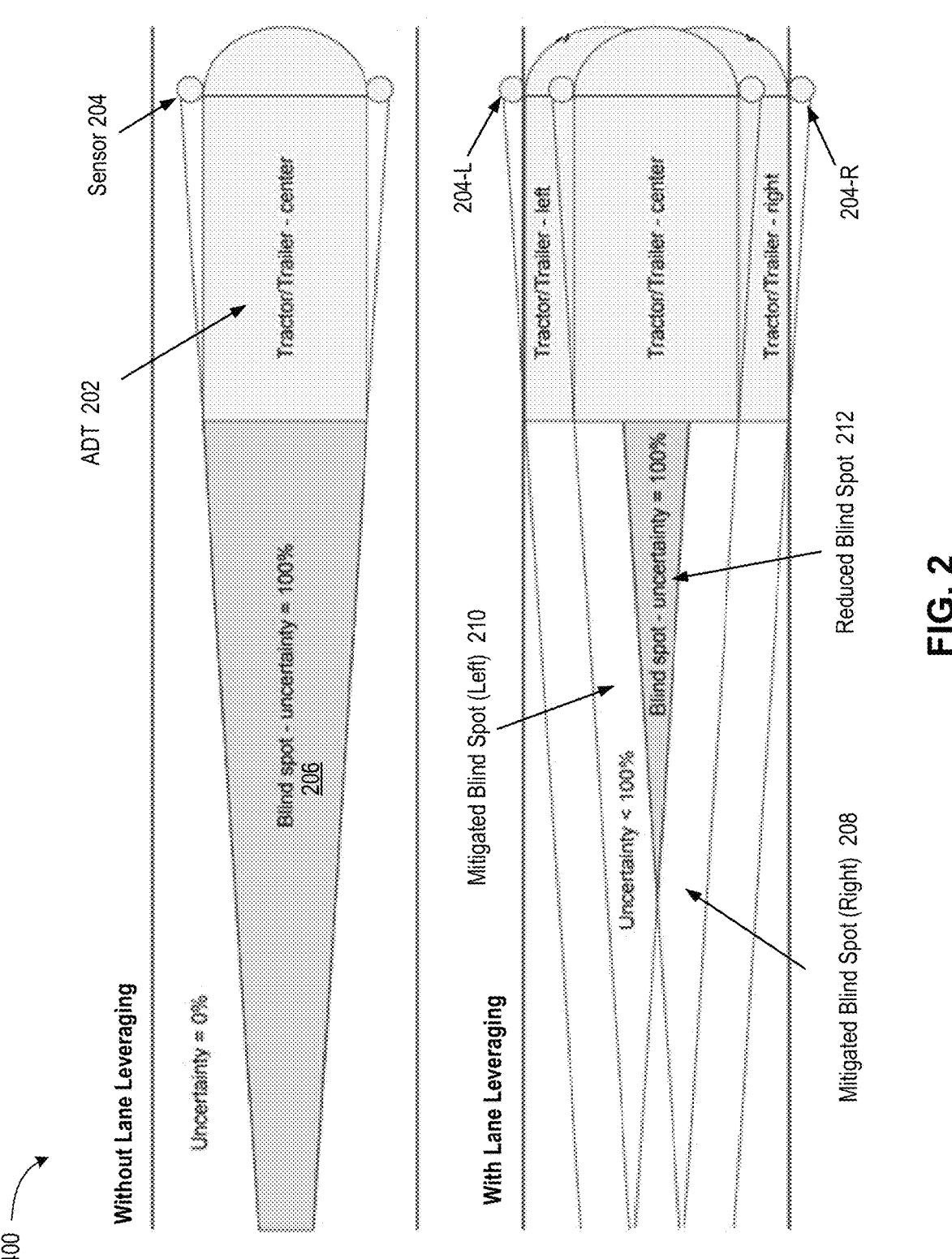
FIG. 2 is a schematic depiction of lane leveraging for blind spot mitigation during operation of an autonomously driven truck, in accordance with some implementations of the present disclosure.

FIG. 2 is a schematic depiction of lane leveraging 200 for blind spot mitigation during operation of an autonomously driven truck, in accordance with some implementations of the present disclosure. An autonomous vehicle, e.g., ADT 202, in the course of a trucking mission is typically towing one or more trailers, whose presence prevents sensors 204 of the sensing system 120 located on the tractor ADT 202 from obtaining a full 360-degree view of the driving environment 110. In particular, the back end of the trailer can prevent the sensor(s) 204 (e.g., LiDAR(s) 122, radar 126, and/or camera(s) 129, etc.) from seeing into a blind spot 206 behind the trailer. Although at least some of sensor(s) 204 can be placed on the outside of the tractor (e.g., on top of the tractor or in place of the rearview mirrors on driver-operated trucks), this may decrease the size of blind spot 206 to a certain degree but not eliminate it completely. Placing sensor(s) 204 at the back of the trailer, on the other hand, may not be optimal because a tractor can haul a different trailer during different trucking missions; so that mounting (and dismantling) expensive sensor systems on the trailer at the beginning (and end) of each mission demands significant time and labor (in mounting, calibration, dismantling, etc.) that would add substantial costs to ADT operations. As a result, one or more vehicles travelling behind ADT within the blind spot 206 can remain undetected/unidentified by the sensing system 120 and the data processing system 130. Being agnostic about such vehicle(s), the AVCS 140 may cause ADT 202 to execute a driving action (e.g., hard braking to negotiate a road bump) that the AVCS 140 would have refrained from if it had been aware of such tailgating vehicle(s). Conversely, having no information about what may be within the blind spot 206, the AVCS 140 may accept the worst-case scenario and assume the presence of a tailgating vehicle. As a result, the AVCS 140 can refrain from braking before a road defect and cause excessive wear of the ADT when the ADT drives over the defect (or obstacle). Similarly, assuming by default that a vehicle is within the blind spot, the AVCS 140 can refrain from braking in a situation where doing so would be more optimal and instead perform an unnecessary lane change, and so on.

To achieve dynamic blind spot mitigation, data processing system 130 can include a software and/or hardware/firmware components, e.g., a driving trajectory control module (DTCM) 133, which can be capable of adjusting the driving path (trajectory) of the ADT to reduce the extent of the blind spot 206. More specifically, DTCM 133 can output instructions to the AVCS 140 to cause ADT to use lane leveraging. In the course of lane leveraging, the ADT can approach the left boundary of the lane (that the ADT is currently occupying)—as indicated by "tractor/trailer—left" position in FIG. 2. Such a leftward driving maneuver can allow the right sensor 204-R to obtain a better view into the blind spot 206, in particular, into the right portion of the blind spot 206 (depicted as the mitigated blind spot (right) 208). Likewise, a subsequent move of the ADT to the right boundary of the lane—as indicated by the "tractor-trailer—right" position in FIG. 2—allows the left sensor 204-L to get a better view into the blind spot 206 from the left (depicted as the mitigated blind spot (left) 210). As a result of such a driving maneuver, the sensing system 120 of the ADT can significantly reduce the width and length of the blind spot, as depicted schematically with a depiction of a reduced blind spot 212.

The presence of the objects within the mitigated blind spot 208/210 may not be known with complete certainty at all times. For example, a tailgating vehicle might have been too close to the ADT for the mitigation maneuver to expose the vehicle, or might have mirrored the maneuver of the ADT and remained within the ADT's blind spot even during the mitigation maneuver, or might have moved into the blind spot (e.g., from an adjacent lane) after the mitigation maneuver has been completed. To enhance blind spot mitigation, the DTCM 133 can schedule additional mitigation maneuvers at periodic time intervals. Additionally, the environment monitoring and prediction component 136 can track vehicles that cross the boundaries of the blind spot 206 (while assuming that the vehicles that disappeared from view have moved into the blind spot 206). In some implementations, a blind spot mitigation maneuver is initiated providing that certain conditions are satisfied. For example, the DTCM 133 can initiate a mitigation maneuver if there are no vehicles in the adjacent lane(s) within a threshold distance. In some implementations, the threshold distance can be computed based on the speed of a vehicle approaching in the adjacent lane. For example, the mitigation maneuver can be initiated if the approaching vehicle is more than 5 second (3 seconds, 7 seconds, or any other predetermined time) away from catching up to the ADT.

In some implementations, a blind spot mitigation maneuver is initiated in view of lane information provided by camera(s) 129. In some implementations, a blind spot mitigation maneuver can be initiated provided that lane information (e.g., the number of lanes, lane width, lane markings) obtained from camera(s) 129 matches the road information stored as part of the map information 135. If a mismatch is detected (e.g., a road work has caused a lane to shift or the number of lanes to be reduced), DTCM 133 can postpone the next mitigation maneuver until the lane information from camera(s) 129 matches the lane information of the map information 135.

In some implementations, the full width of the lane can be leveraged, e.g., during execution of the mitigation maneuver, the ADT moves all the way to the left (right) boundary and then all the way to the right (left) boundary. In some implementations, a set portion of the lane (e.g., 85% of the lane width, 90% of the lane width, 95% of the lane width, etc. is leveraged). In some implementations, when it is determined that no vehicles are present in the adjacent lane(s) within a predetermined distance or that no vehicle is to catch up to the ADT (as computed from detected velocities of the vehicles) within a predetermined time, DTCM 133 can communicate to the AVCS 140 that it is safe to move the ADT over the lane boundary. In some implementations, such exceeding of the lane width can be performed over the boundary between two lanes in the same direction, but is not performed when the boundary is with an oncoming traffic lane or with the shoulder of the road. In some implementations, when negotiating a turn (e.g., a left turn), the ADT can move ("nudge") toward the outside (e.g., right) boundary of the lane (or road) to enable the best view into the blind spot behind the ADT. This allows the inside sensor (e.g., sensor 204-L) to detect objects (e.g., tailgating vehicles) that are positioned within the blind spot on straight sections of the road.

Unfavorable weather conditions, such as rain, snow, mist, wind, and the like, can present various challenges for autonomous driving vehicles, and trucks in particular. Spray from other vehicles can contaminate outside optical elements of the sensing system of ADT and result in suboptimal performance of the sensing system and, consequently, of the data processing system that receives information from the sensing system. Similarly, wind and wind gusts can result in continuous need for steering and correcting ADT positioning on the roadway, which can lead to an increased tire wear. Aspects of the present disclosure address these and other problematic weather-induced issues by positioning the ADT relative to other vehicles in a way that protects outside sensors from adverse weather conditions and shields the ADT from wind and wind gusts.

Figure 3:
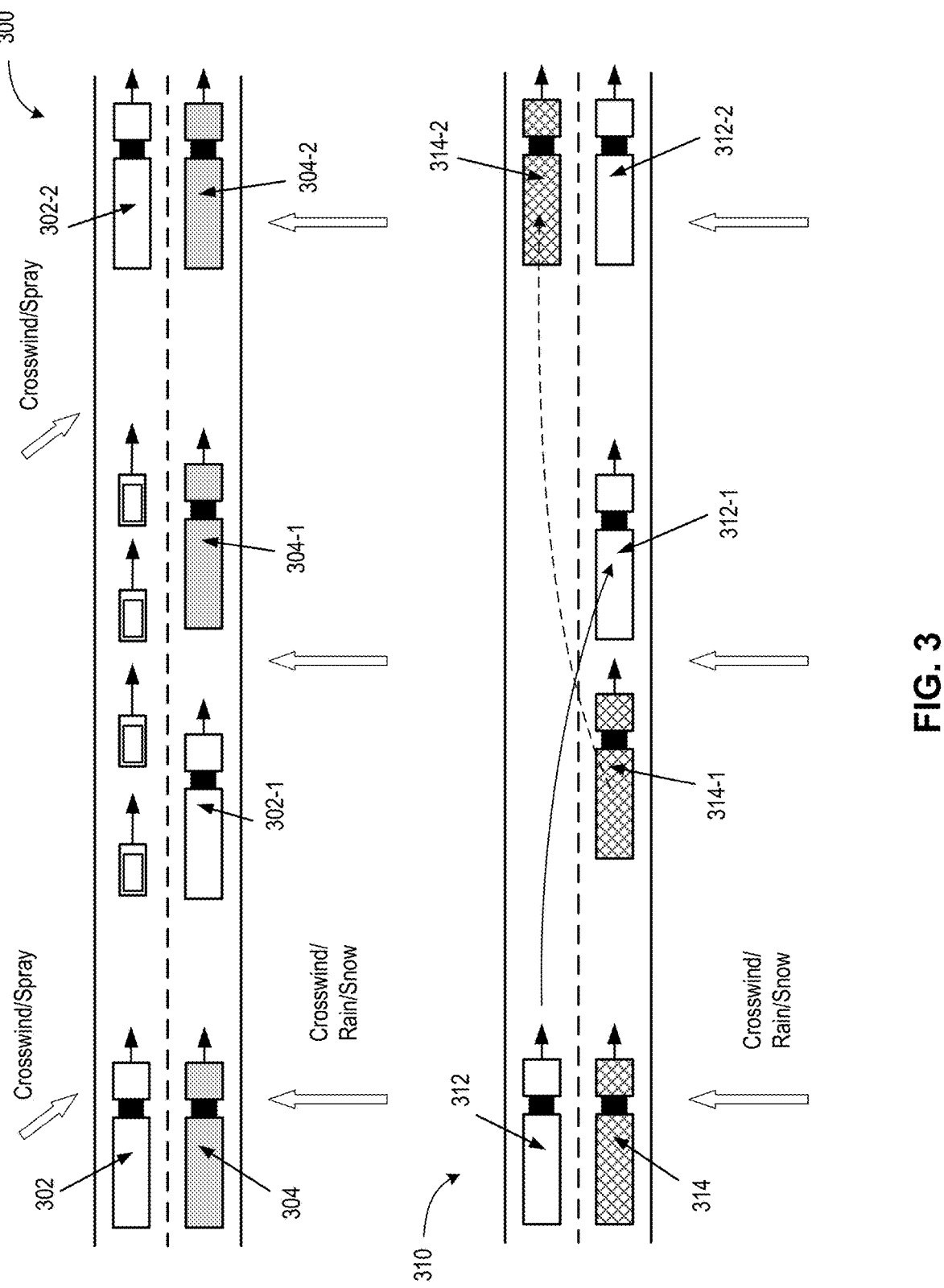
FIG. 3 is a schematic depiction of vehicle shielding for autonomously driven trucks encountering unfavorable weather conditions, in accordance with some implementations of the present disclosure.

FIG. 3 is a schematic depiction of vehicle shielding for autonomously driven trucks encountering unfavorable weather conditions, in accordance with some implementations of the present disclosure. In implementation 300, illustrated in FIG. 3, ADT 302 is being shielded by another vehicle 304 (e.g., another truck). As a result of such positioning, ADT 302 can experience more favorable conditions compared to other kinds of ADT positioning. For example, in case of a crosswind coming from the left (downward arrows), spray from a wet road surface lifted by the wheels of a moving vehicle can be drifting towards the right side of the road. Accordingly, positioning ADT 302 on the left (or any other upwind direction) from vehicle 304 can protect the sensing system of ADT 302 and reduce the amount of spray reaching sensors of ADT 302. To implement such a strategic positioning, the sensing system 120 of ADT 302 can identify LiDAR reflection points associated with the mist cloud (and, optionally, velocity of the mist cloud) and the perception system 132 can determine the direction of drift of the mist/spray cloud. Alternatively (or additionally), camera(s) 129 can provide, to the perception system 132, visual information of the driving environment 110 and assist the perception system 132 in determining the direction of wind/ spray drift. Additionally, radar(s) 126 and sonar(s) 128 can be used to detect mist/spray, e.g., based on the changed intensity or pulse elongation of the returned radio waves and/or ultrasound waves, or using any other suitable detection techniques. Furthermore, the perception system 132 can identify positions of other vehicles on the road. Based on identified direction of spray drift and positions of other vehicles, the driving trajectory control module (DTCM) 133 can determine the optimal positioning of the ADT 302 relative to other vehicles, e.g., on the upwind side of vehicle 304.

In some implementations, positioning of ADT 302 can be determined based on the current traffic conditions. For example, in heavy traffic (as depicted schematically by the middle top picture in FIG. 3) DTCM 133 can position ADT 302 into a right lane (e.g., ADT 302-1 following vehicle 304-1) regardless of the direction of wind/spray drift. When traffic conditions improve, ADT can be moved back to a more favorable position (ADT 302-2) upwind of vehicle 304-2 (which can be the same or different from vehicle 304-1).

When wind speed increases and optimal steering becomes a more important issue than sensor contamination, DTCM 133 can reposition the ADT differently relative to other vehicles, e.g., downwind from other vehicles, to shield the ADT from wind and/or wind gusts. In such instances, the same positioning of ADT 302 relative to vehicle 304, as shown in implementation 300, can be used to protect ADT 302 from wind coming from the right side, as indicated by the upward arrows. In such instances, positioning of ADT 302 downwind of vehicle 304 can reduce tire wear (and, possibly, steering system wear). Decision whether to place the ADT upwind or downwind from other vehicle(s) can be made by DTCM 133 by weighing multiple factors. Under dry but windy conditions, downwind positioning can be favored as providing maximum benefit to the drivetrain/ steering/tires. Under wet but light wind conditions, DTCM 133 can favor upwind positioning, as providing the maximum benefit to the sensing system. Under wet and high wind conditions, DTCM can weigh the benefit provided to the sensing system (if the ADT positioned upwind) against the benefit to the drivetrain/steering/tires (if ADT positioned downwind). A variety of empirical metrics can be used as weighing functions with empirically determined parameters.

In some implementations, various models of machine learning can be used with weighing parameters learned (determined) during training.

Implementation 310 (depicted at the bottom of FIG. 3) involves cooperative behavior of multiple vehicles (two vehicles are shown, although more than two vehicles can be involved). A person of ordinary skill in this technology should understand that there are numerous ways in which different ADTs can cooperate to find positions advantageous to some or all of the vehicles. One non-limiting example of cooperative behavior is described in the following. First ADT 312 can be shielded by another autonomous vehicle, e.g., second ADT 314 for a portion of the driving mission. Later, as shown by the middle picture, first ADT 312 can move into a position 312-1 ahead of (as depicted) or behind the second ADT 314 in position 314-1 and the two vehicles can exchange their roles (as shown by positions 312-2 and 314-2) for the next section of the driving mission. The status of the vehicles (e.g., a shielding vehicle vs. a shielded vehicle) can be changed at regular time intervals (or after a certain distance of travel) with the new vehicle receiving "shielded" status being placed upwind or downwind from the vehicle receiving "shielding" status. A decision on which side of the shielding vehicle the shielded vehicle is to be placed can be made as described above in relation to implementation 300. Because both first ADT 312 and second ADT 314 can be equipped with respective DTCMs, DTCM of first ADT 312 can be in communication (e.g., over radio, wireless network protocol, etc.) with DTCM of second ADT 314 to coordinate relative positioning of both vehicles. In some implementations, the communication between first ADT 312 and second ADT 314 is performed via a direct communication link (e.g., radio link). In some implementations, the communication can be indirect, facilitated by any suitable external station. For example, first ADT 312 (or second ADT 314) can communicate information to a dispatch/control center and the dispatch/control center can then relay the communicated information to second ADT 314 (or first ADT 312). In some implementations, one of the DTCMs/vehicles can be designated as a primary DTCM/ vehicle whereas the other DTCM/vehicle can be designated a secondary DTCM/vehicle. The primary DTCM can be responsible for determining the optimal positioning of both vehicles while the secondary DTCM can communicate instructions received from the primary DTCM to the secondary vehicle's AVCS. The primary DTCM can determine relative positioning of the two vehicles (as well as specific timing schedule for position changes) based on sensing data received from the primary vehicle's sensing system as well as from the sensing data communicated by the secondary vehicle's sensing system. Communication of the sensing data between the vehicles can be enabled by a sensing system cooperation module (SSCM) 131.

An autonomously driven truck can be hauling one or more cargo trailers, whose presence can limit the field of view of the ADT's sensing system and result in a blind spot forming behind the trailer(s). Because a tractor can haul different trailers during different trucking missions, placing sensor(s) at the back of the trailer can be impractical and/or overly expensive. A human driver-operated vehicle often requires outside help (e.g., help from a spotter person) when backing up, if no rear-facing camera is available to the driver. Implementations disclosed herein describe methods and systems that provide outside help and expand the field of view of an ADT.

Figure 4A:
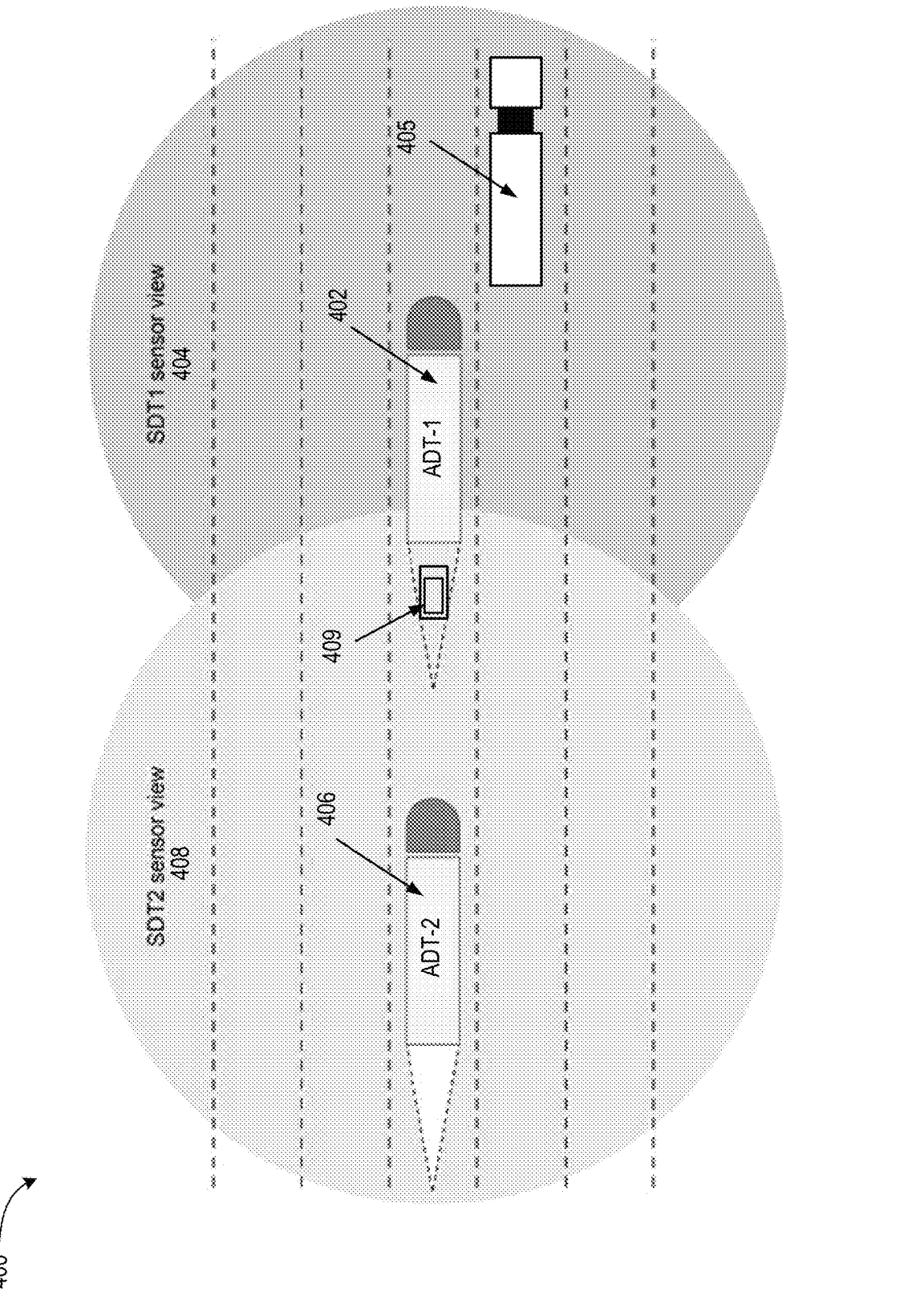
FIG. 4A is a schematic depiction of an expansion of a field of view of an autonomously driven truck that uses cooperation with another vehicle, in accordance with some implementations of the present disclosure.

FIG. 4A is a schematic depiction of an expansion of a field of view of a autonomously driven truck that uses cooperation with another vehicle, in accordance with some implementations of the present disclosure. In implementation 400, shown is a first ADT 402 having a first field of view 404. The field of view refers to a region of a driving environment 110 that is accessible to one or more LiDAR(s) 122, radar(s) 126, sonar(s) 128, camera(s) 129, and the like. Also depicted is another vehicle, e.g., second ADT 406 having a second field of view 408. Distances depicted in FIG. 4A are for illustration purposes only and may not be up to scale. In particular, second ADT 406 can be at a distance of hundreds of meters or even much more from first ADT 402. First ADT 402 and second ADT 406 can exchange sensing data obtained by the sensing systems of each respective ADT. Cooperation in sharing sensing data between first ADT 402 and second ADT 406 can be facilitated by sensing system cooperation module (SSCM) 131. In some implementations, sensing data shared by first ADT 402 with second ADT 406 (or vice versa) can be in a raw data format, e.g., including coordinates and velocities of individual points that reflect signals emitted by LiDAR(s) 122 of first ADT 402, pixel maps obtained by camera(s) 129 of first ADT 402, and so on. Additionally, SSCM 131 of first ADT 402 can provide, to second ADT 406, identification of locations of the sensors of first ADT 402. Additional synchronization signals can be exchanged between first ADT 402 and second ADT 406 to synchronize the times when different sensing data is obtained by each of the vehicles. Using the locations of sensors of first ADT 402, data processing system 130 of second ADT 406 can process the received raw data as if the raw data were collected by the sensing system 120 of second ADT 406, effectively expanding the field of view to the areas that are accessible to sensing system of first ADT 402 but not accessible to sensing system of second ADT 406 (e.g., because such areas are too far from first ADT 402 or are obscured by other vehicles or objects). For example, second ADT 406 can be moving uphill but is yet to reach the summit whereas first ADT 402 might have already begun assent from the summit and is currently collecting sensing data from a much broader and longer field of view.

In some implementations, shared data can be in a processed format (e.g., object format). In particular, rather than sharing coordinates and velocities of individual LiDAR points or camera pixel maps, SSCM 131 of first ADT 402 can share locations of objects identified by the data processing system of first ADT 402. Communication of processed data can place fewer demands on a bandwidth of the communication channel. For example, instead of communicating various points within first field of view 404, first ADT 402 can communicate to second ADT 406 information about identified vehicle 405, such as location, size, speed of vehicle 405 (and, possibly, other information about vehicle 405). Similarly, in a two-way cooperation with first ADT 402, second ADT 406 can communicate to first ADT 402 information about location, size, speed, etc., of vehicle 409 positioned within the blind spot of first field of view 404 of first ADT 402.

Figure 4B:
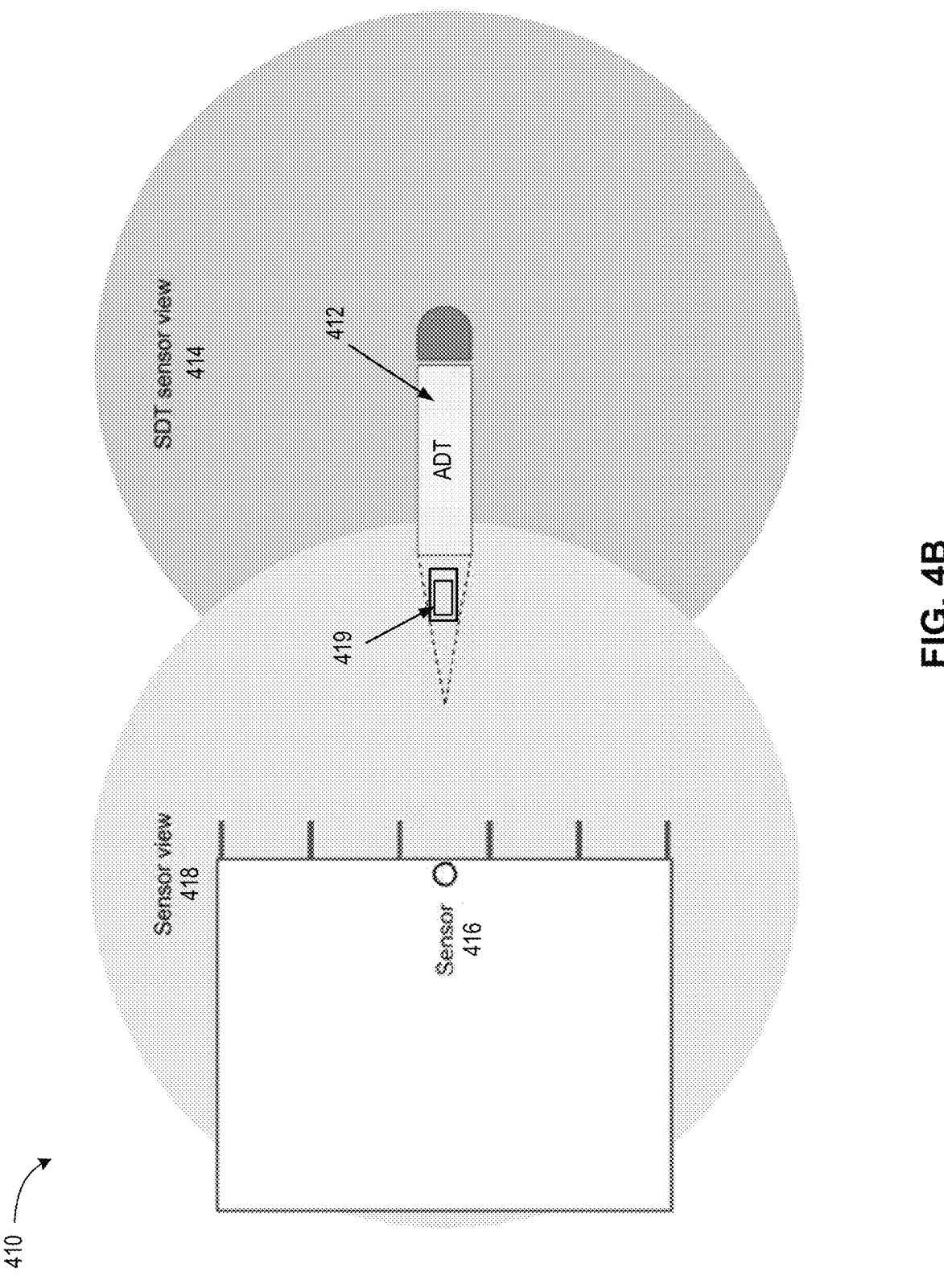
FIG. 4B is a schematic depiction of an expansion of a field of view of a autonomously driven truck based on communication with a stationary sensing system, in accordance with some implementations of the present disclosure.

FIG. 4B is a schematic depiction of an expansion of a field of view of a autonomously driven truck based on communication with a stationary sensing system, in accordance with some implementations of the present disclosure. In implementation 410, shown is ADT 401 having field of view 414. Also depicted is a stationary sensing system (sensor) 416 (whose depiction may not be up to scale) that can include one or more LiDAR(s), radars, cameras, and other imaging devices. Stationary sensing system 416 can be placed at a location known to be a challenging driving spot for autonomously driven trucks, such as a loading/unloading yard, fueling station, weighing station, customs checkpoint, agricultural checkpoint, technical checkpoint, road blind spot, outside of a curved section of the road, summit of a mountain road, or any other place or a part of a road where autonomously driven trucks may have to perform driving maneuvers involving backing up and/or precision steering, or the like. Stationary sensing system 416 can have a sensing field of view 418 that covers typical blind spots of trucks (such as ADT 412) performing various driving maneuvers encountered or anticipated to be performed during driving, loading, unloading, refueling, and the like. Stationary sensing system 416 can provide sensing data to ADT 412 (e.g., to SSCM 131 of ADT 412). In some implementations, sensing data provided by stationary sensing system 416 can be in the raw data format (as described in more detail in relation to FIG. 4A). In other implementations, sensing data can be provided in the object format, e.g., identifying types, sizes, locations velocities, angular velocities, etc., of the vehicles within the sensing field of view 418, including those objects that are invisible or almost invisible (e.g., vehicle 419) to the sensing system of ADT 412. Using ADT's own sensing field of view 414 augmented with sensing data received from stationary sensing system 416, ADT 412 can be capable of execution of various driving maneuvers with improved safety and precision.

In some implementations, each ADT capable of sharing and/or receiving sensing data (from other ADTs or from stationary sensing systems) can be identified to other vehicles with a unique identifier (ID), e.g., a media access controller (MAC) address assigned to the respective ADT, which can be transmitted periodically using beacon communication frames. Similarly, any stationary sensing system can be transmitting beacon frames with the system's MAC address. When a vehicle capable of exchanging sensing data receives such a beacon communication frame, the two vehicles (or the vehicle and the stationary sensing system) can exchange authenticating frames and establish a communication channel. In some implementations, the communication channel can use a secure (e.g., encrypted) communication protocol. Two vehicles (or a vehicle and a stationary sensing system) can then begin exchanging data until the distance between the vehicles (or the vehicle and the stationary sensing system) exceeds the maximum radius of communication, e.g., when two vehicles become separated or when the vehicle leaves the area equipped with the stationary sensing system. In some implementations, the distance of communication between vehicles can be further extended by uploading data (e.g., using existing communication channels) to a command center and distributing the uploaded data from the command center to other vehicles that are currently outside of the distance of direct communication between the vehicles.

FIG. 5, FIG. 6, and FIG. 7 depict flow diagrams illustrating methods 500, 600, and 700 of enhancing perception of sensing systems of autonomously driven trucks under various conditions, in accordance with some implementations of the present disclosure. Methods 500, 600, and 700 described below, and/or each of their individual functions, routines, subroutines, or operations can be performed by a processing device, having one or more processing units (CPU) and memory devices communicatively coupled to the CPU(s). In certain implementations, each of methods 500, 600, and 700 can be performed using a single processing thread. Alternatively, each of methods 500, 600, and 700 can be performed using two or more processing threads, each thread executing one or more individual functions, routines, subroutines, or operations of the method. In an illustrative example, the processing threads implementing each of methods 500, 600, and 700 can be synchronized (e.g., using semaphores, critical sections, and/or other thread synchronization mechanisms). Alternatively, the processing threads implementing each of methods 500, 600, and 700 can be executed asynchronously with respect to each other. Various operations of each of methods 500, 600, and 700 can be performed in a different order compared with the order shown in FIG. 5, FIG. 6, and FIG. 7. Some operations of the methods can be performed concurrently with other operations. Some operations can be optional.

FIG. 5 depicts a flow diagram of an example method 500 of blind spot mitigation during autonomous trucking missions by an ADT, in accordance with some implementations of the present disclosure. The ADT can be ADT 100 of FIG. 1A, ADT 202 of FIG. 2, and the like. Method 500 can be used to improve safety and efficiency of autonomous trucking missions. The processing device(s) performing method 500 can execute instructions from various components of the AV, e.g., driving trajectory control module (DTCM) 133 or any other suitable component of data processing system 130. Method 500 may be performed while the AV is moving, e.g., on a highway, on a city street, while traveling on any road (e.g., a rural road), off-road, within a transfer hub, loading zone, parking area, and the like. During travel of the AV, a body of the AV may define an occluded region in an environment of the AV (e.g., blind spot 206) that is not visible to various sensors of the sensing system of the AV. The occluded region changes with time (relative to the ground) in the course of the motion of AV; e.g., the occluded region is following the AV.

At block 510, an AV control system (e.g., AVCS 140) can shift the AV in a first direction that is lateral to a direction of motion of the AV. For example, as shown in FIG. 2, ADT 202 can move to the left (or right) relative to the direction of its motion; e.g., up (or down), as depicted in FIG. 2. The shift of the AV may expose a first portion of the occluded region (e.g., mitigated blind spot (right) 208) to a first sensor of a sensing system of the AV (e.g., sensor 204-R). At block 520, method 500 may continue with the data processing system receiving a sensing data from the sensing system. The received sensing data may include a part (e.g., a first part) obtained using the first sensor and imaging the first portion of the occluded region.

Similarly, at block 530, the AV control system can (optionally) shift the AV in a second direction (e.g., to the right) that is opposite to the first direction and expose a second portion of the occluded region (e.g., mitigated blind spot (right) 210) to a second sensor of the sensing system of the AV (e.g., sensor 204-L). In some implementations, the shift in the second direction can be to the same (or approximately the same) distance from the center driving line as the first shift (but in the opposite direction). For example, the first shift to the right can be to distance $+\Delta$ from the center driving line; the second shift to the left can be to distance $-2\Delta$ from the center driving line, which can then be followed by the compensating shift $-\Delta$ back to the center driving line. At block 540, the processing device may receive, from the sensing system, a second part of the sensing data obtained using the second sensor and imaging the second portion of the occluded region.

In some implementations, each of the first sensor and the second sensor can include one or more of camera sensors or lidar sensors. Any of the camera sensors and/or lidar sensors can be surround-view sensors, high-definition sensors, dedicated rearward-looking sensors, and the like. In some implementations, each of the first sensor and the second sensor can include one or more radar sensors.

At block 550, method 500 may continue with the data processing system establishing, using the received sensing data, an existence of a driving condition associated with the occluded region. The driving condition can include a presence of a vehicle (or more than one vehicle) within the occluded region. The driving condition can include an absence of a vehicle within the occluded region. At block 560, method 500 can continue with the processing device causing a driving path of the AV to be determined in view of the established driving condition. The driving path should be understood broadly as encompassing a driving line followed by the AV and the speed regime of the AV. For example, the driving path can include steering, acceleration, braking, stopping, etc., of the AV or any other driving maneuver executed by the AV. For example, if it is established that there is a vehicle within the occluded region, the AV can abstain from a planned lane change, braking, and the like. Conversely, if it is established that there is no vehicle within the occluded region, the AV can initiate performance of the aforementioned maneuvers.

In some implementations, shifting the AV in the first (and/or second) direction can be performed responsive to the AV traveling on a curved roadway (e.g., making a left or right turn). In such instances, the first direction of the AV shift can be in a radial outward direction of the curved roadway. This can allow the first sensor (positioned on the inward side of the AV) to acquire an expanded field-of-view into the curved roadway behind the AV.

In some implementations, shifting the AV in the first direction and in the second direction can be performed periodically with a predetermined period. For example, the AV can shift in the first direction every n seconds (or minutes) of driving and can then shift in the second direction m seconds after shifting in the first direction. The values of n and m may be determined by the amount of traffic, with shorter periods used in heavier traffic and longer periods used in lighter traffic.

In some implementations, shifting the AV in the first (and/or second) direction can be contingent on an absence of another vehicle, within a predetermined distance, in a lane that is adjacent to a lane of travel of the AV. For example, if there is a vehicle in the lane that is to the left of the lane of travel of the AV within a truck length (two truck lengths, etc.) from the front or back of the AV, the AV can abstain from shifting in the lateral direction towards the other vehicle and/or only perform a shift in the opposite direction (or abstain from shifting the opposite direction as well).

In some implementations, shifting the AV in the first (and/or second) direction can be contingent on the data processing system accessing a mapping data for the region of travel of the AV and determining that the mapping data is consistent with forward-sensing data obtained by one or more forward-sensing sensors of the sensing system of the AV. For example, the mapping data can include a lane mapping data and the forward-sensing sensors can include any sensors capable of acquiring the picture of the lanes (e.g., lidars, forward-facing cameras, surround-view cameras, and so on).

In some implementations, the AV is shifted in the first direction (and/or in the second direction) over a predetermined portion of the lane of travel of the AV, e.g., such that the distance from the leftmost point of the AV at the end of the left shift to the rightmost point of the AV at the end of the right shift is within 85%, 90%, 95%, etc. of the width of the lane. In some implementations, the AV can be shifted in the first direction (or the second direction, or both) until a portion of the AV is in a lane that is adjacent to the lane of travel of the AV. For example, the AV can shift into the adjacent lane over a certain predetermined portion of that lane, e.g., to within 10%, 15%, etc., of the width of the adjacent lane. In some implementations, the AV can shift to the adjacent lane provided that the adjacent lane is free from other vehicles (e.g., within a certain distance from the AV). In some implementations, the AV can shift to the adjacent lane only if the adjacent and the lane of travel of the AV have the same directions of travel.

FIG. 6 depicts a flow diagram of an example method 600 of an expansion of a field of view of an autonomously driven truck that uses cooperation with another vehicle or a stationary sensing system, in accordance with some implementations of the present disclosure. The autonomously driven truck can be ADT 100 of FIG. 1A, ADT 202 of FIG. 2, and the like. Method 600 can be used to improve safety and efficiency of autonomous trucking missions. The processing device executing method 600 can perform instructions from various components of the AV, e.g., sensing system coordination module (SSCM) 131 or any other suitable component of data processing system 130. Method 600 can be performed while the AV is moving (forward or backward) or is stationary (e.g., before starting motion) and can be performed while the AV is on a highway, on a city street, while traveling on any road (e.g., rural road), off-road, within a transfer hub, loading zone, parking area, and the like.

At block 610, method 600 can include operating the AV that has a first sensing system (e.g., sensing system 120 illustrated in FIG. 1A). At block 620, method 600 can include establishing a communication channel with an external host that has access to an information obtained by a second sensing system. In some implementations, the external host can be, or include, a hub that is stationary relative to ground (e.g., a station that hosts stationary sensing system 416 of FIG. 4B) and has the second sensing system mounted thereon. In some implementations, the external host can be a second AV, e.g., second ADT 406 illustrated in FIG. 4A. In some implementations, the second sensing system can be mounted on the second AV and the hub can have access to the information from the second sensing system via a communication link (e.g, a radio communication link). In some implementations, establishing the communication channel with the external host is performed by transmitting, by the first AV, one or more beacon communications indicating capability of the first AV to establish the communication channel. For example, the beacon communications (e.g., frames) can identify the first AV, as belonging to a specific class, fleet, commercial operator, individual AV identification, type of the sensing system, and the like. The beacon communications can further include cryptographic information (e.g., a public cryptographic key for symmetric encryption of data communication).

At block 630, method 600 can continue with obtaining, using the first sensing system, a first run-time data for a first region of a driving environment of the first AV. For example, the first run-time data can include any sensing data obtained by lidars, radars, cameras, sonars, etc., of the first sensing system of ADT 402 (of FIG. 4A) for first field of view 404. The first run-time data can include identification of vehicle 405 within the first region. The first sensing system can fail to identify vehicle 409 (FIG. 4A) or vehicle 419 (FIG. 4B) positioned within the blind spot behind the first ADT.

At block 640, the data processing system of the AV can receive, over the communication channel, a second run-time data for a second region of the driving environment of the first AV. In some implementations, at least a portion of the second region is not accessible to the first sensing system. For example, second sensor view 408 (FIG. 4A) and sensing field of view 418 of a stationary hub (FIG. 4B) can extend beyond the reach of the first sensing system. The second run-time data may include a lidar data obtained using the second sensing system, a radar data obtained using the second sensing system, a camera data obtained using the second sensing system, or any combination thereof, or a sonar data obtained using the second sensing system.

In some implementations, the second AV (e.g., second ADT 406) is positioned behind the first AV (e.g., first ADT 402) and the second region includes a blind spot of the first AV. In some instances, the second AV is positioned in front of the first AV. The first AV can be located on an uphill portion of a roadway, and the second AV can be located (ahead of the first AV) on the downhill portion of the roadway. In such instances, the second region can include a downhill portion of the roadway (that is still ahead of the first AV and not visible to the first AV). In some implementations, the hub hosting the second sensing system can be positioned near a top of the roadway and can provide sensing (run-time) data to the vehicles approaching the top of the roadway.

In some implementations, the second run-time data can include a position of an object in the second region, a size of an object in the second region; a speed of an object in the second region, a direction of motion of an object in the second region, or any combination thereof. In some implementations, the second run-time data can include changes in size, speed (e.g., acceleration), direction, changes in acceleration (e.g., a sudden jerk), and so on. For example, the second sensing system of second ADT 406 (FIG. 4A) can determine the size and coordinates of vehicle 409 (e.g., from camera data and lidar data of second ADT 406) located within the blind spot of first ADT 402, and can further determine the speed and direction of motion of vehicle 409 (e.g., from radar and/or lidar data). Similarly, the sensing system 416 (FIG. 4B) can determine the size, coordinates, speed, and/or direction of motion of vehicle 419 (e.g., from camera data and lidar data of second ADT 406) located within the blind spot of first ADT 412.

At block 650, method 600 can continue with the data processing system of the AV causing a driving path of the first AV to be determined in view of the first run-time data and the second run-time data. For example, based on the first run-time data and the second run-time data, the data processing system of the first AV can identify a location and a speed of vehicle 405 within the first region and vehicle 409 within the second region (FIG. 4A). The driving path, determined by the AV control system and based on the data received from the data processing system, can include steering, acceleration, braking, stopping, etc., of the first AV or any other driving maneuver executed by the AV.

FIG. 7 depicts a flow diagram of an example method 700 of vehicle shielding of autonomously driven trucks in unfavorable driving conditions, in accordance with some implementations of the present disclosure. The autonomously driven truck can be ADT 100 of FIG. 1A, ADT 202 of FIG. 2, and the like. The processing device executing method 700 can perform instructions from various components of the AV, e.g., driving trajectory control module (DTCM) 133 or any other suitable component of data processing system 130. Method 700 may be performed while the AV is moving, e.g., on a highway, on a city street, or while traveling on any roadway that has multiple lanes in the direction of travel of the AV and can be used to improve safety and efficiency of autonomous trucking missions. In some implementations, method 700 can be performed under wet weather conditions, such as during rainy or snowy weather, or right after an occurrence of such weather, when the roadway is still wet. In some implementations, method 700 can be performed under dry weather conditions when the road is wet due to conditions other than precipitation within the immediate driving area, e.g., as can be caused by a flooding, water (or other fluid) spill, and so on. In some implementations, method 700 can be performed during other types of adverse weather conditions, such as sandstorms.

At block 710, method 700 can include identifying, by the data processing system of the AV, a presence of another vehicle within a predetermined vicinity of the AV. In some implementations, the other vehicle can be an autonomously driven truck belonging to the same fleet as the AV. Various operations of method 700 can evaluate a possibility of using the other vehicle as a shielding vehicle for the AV under the adverse driving conditions.

At block 720, method 700 can continue with identifying, by the data processing system of the AV, a plurality of factors characterizing the driving conditions. For example, one factor can include a crosswind speed $V_\perp$ (e.g., wind speed in a direction that is lateral to the direction of motion of the AV); a second factor can include an amount N of moisture in an ambient air caused by the other vehicle, which can be expressed in any suitable way, e.g., as mass density of the moisture, particle density of the moisture, a fraction of volume occupied by the moisture, and the like.

As depicted with the callout portion in FIG. 7, identifying the crosswind speed can include (block 722) using a lidar data obtained by a sensing system of the AV to determine a direction of motion of the particles of moisture, which can be identified as an angle $\theta$ counted from the direction of driving, e.g., with $\theta > 0$ corresponding to the wind coming from the right and $\theta < 0$ corresponding to the wind coming from the left (or vice versa, or in any other similar way). Identifying the crosswind speed can further include determine a speed of the particles of moisture, V. The crosswind speed may then be determined as $V_\perp = V \sin \theta$. In some implementations, the speed and direction of motion of the particles of moisture can be determined based on lidar returns from the particles of moisture. Since the particles of moisture can perform a chaotic motion that is superimposed on a more uniform wind-induced drift, the chaotic motion can be eliminated (during analysis of the lidar data by the data processing system), e.g., by averaging of the speed and direction of the particles' motion over a certain time period or over a certain volume or both.

As further indicated by block 724, identifying the amount of the particles of moisture in the ambient air caused by the other vehicle can be based on the lidar data and/or a camera data obtained by the sensing system of the AV. For example, the density of the particles of moisture can be estimated using the intensity of lidar (or radar) returns, via determining the broadening of lidar (or radar) returns in time, occurring due to scattering of lidar (radar) beams off the particles of moisture located at different distances from the lidar receiver. In some implementations, the density of the particles of moisture can be estimated using sonar reflections. The amount of the particles of moisture caused by the other vehicle can be further identified as a difference between the amount of particles in the vicinity of the other vehicle (e.g., on the downwind side of the other vehicle) and between the amount of particles at some distance from the other vehicle, where spray from the tires of the other vehicle does not reach.

At block 730, method 700 can continue with computing, by the data processing system of the AV, an evaluation measure that characterizes a relative strength of the crosswind speed $V_\perp$ and the amount of moisture N caused by the other vehicle. The evaluation measure can evaluate a utility of placing the AV on a downwind side of the other—shielding—vehicle (to protect the sensors of the AV from the particles of moisture against placing the AV on an upwind side of the shielding vehicle (to protect against mechanical impact of wind). A large amount of the moisture caused by the other vehicle can favor placing the AV on the upwind side of the other vehicle whereas a large crosswind speed can favor placing the AV on the downwind side of the other vehicle. In some implementations, the evaluation measure can be a combination of both factors, e.g., $M(V_\perp, N) = \alpha \cdot |V_\perp| - \beta \cdot N$, with empirically determined coefficients (weights) a and $\beta$. In some implementations, the evaluation measure $M(V_\perp, N)$ can be a nonlinear function of $V_\perp$ and N (e.g., a power-law function or any other suitable nonlinear function). In some implementations, the evaluation measure $M(V_\perp, N)$ may not be reduced to a difference of a first function of $V_\perp$ and a second function of N, but can be a combination thereof, e.g., $M(V_\perp, N) = \alpha |V_\perp|/N$ md or $M(V_\perp, N) = \alpha \cdot |V_\perp|/N^\beta$, or any other suitable function.

At block 740, method 700 can continue with the data processing system of the AV causing, based on the evaluation measure, the AV to be positioned on a first side of the other vehicle, e.g., on the upwind side or the downwind side of the other vehicle. In some implementations, the determination may be performed by comparing the computed evaluation measure M to one or more thresholds, $M_1, M_2 \ldots$. For example, if the evaluation measure has a first relationship with a first threshold, e.g., $M \le M_1$, the crosswind factor may be less important than the amount of moisture (spray) caused by the other vehicle. In such instances, the AV may be positioned on the upwind side of the other vehicle, to minimize contamination of the sensing system of the AV by the spray from the other vehicle. Similarly, if the evaluation measure has a second relationship with a second threshold, e.g., $M \ge M_2$, the crosswind factor may be strong enough to outweigh the spray factor. In such instances, the AV may be positioned on the downwind side of the other vehicle, to minimize the mechanical impact of the wind on the AV. In those instances, if it is determined that $M_1 < M < M_2$, the data processing system can abstain from taking an action related to shielding. In some implementations, $M_1 = M_2$, so that at least some shielding action is always performed.

In some implementations, as illustrated with optional blocks 750-760, the other vehicle can be a vehicle (e.g., another autonomous truck) that takes part in cooperative shielding. More specifically, at block 750, the data processing system of the AV can determine that a set time has expired after the initial positioning of the AV on the first side (e.g., upwind or downwind) of the other vehicle. The set time can be 15 minutes, 30 minutes, 60 minutes, or any other suitable time. Responsive to the expiration of the set time, at block 760, the data processing system of the AV can cause the AV to be repositioned on the second side of the other vehicle, wherein the second side is opposite to the first side. In some implementations, such a cooperative repositioning of the two vehicles can be coordinated between the data processing systems of the two vehicles by exchanging coordinating communications. Both the initial positioning of the AV and the subsequent repositioning of the AV can be contingent on the traffic conditions, e.g., availability of more than two lanes for travel in the same direction, a number of vehicles on the road less than a certain condition, and the like. In some implementations, the repositioning can be repeated every set time and/or when traffic conditions permit so.

Figure 8:
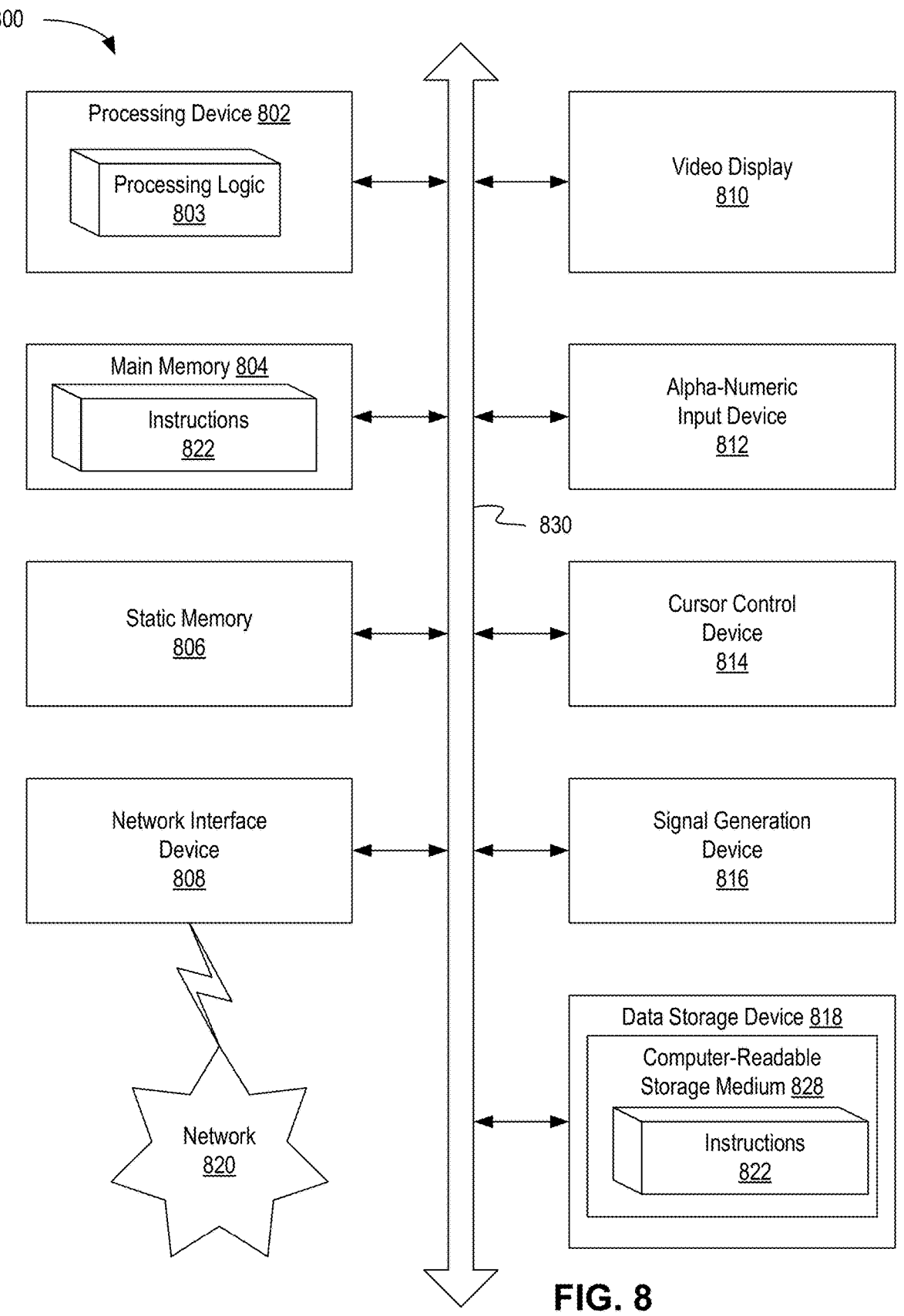
FIG. 8 depicts a block diagram of an example computer device capable of performing operations in accordance with some implementations of the present disclosure.

FIG. 8 depicts a block diagram of an example computer device 800 capable of performing operations in accordance with some implementations of the present disclosure. Example computer device 800 can be connected to other computer devices in a LAN, an intranet, an extranet, and/or the Internet. Computer device 800 can execute operations of the sensing system 120, data processing system 130, AVCS 140, or any combination thereof. Computer device 900 can execute operations of a dispatch/control center. Computer device 800 can operate in the capacity of a server in a client-server network environment. Computer device 800 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 800 can include a processing device 802 (also referred to as a processor or CPU), which can include processing logic 803, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory (e.g., a data storage device 818), which can communicate with each other via a bus 830.

Processing device 802 represents one or more general-purpose processing devices such as a microprocessor, central processing unit, or the like. More particularly, processing device 802 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 802 can be configured to execute instructions performing method 500 of method of blind spot mitigation during autonomous trucking missions by an ADT, method 600 of an expansion of a field of view of an autonomously driven truck that uses cooperation with another vehicle or a stationary sensing system, and method 700 of vehicle shielding of autonomously driven trucks in unfavorable driving conditions.

Example computer device 800 can further comprise a network interface device 808, which can be communicatively coupled to a network 820. Example computer device 800 can further comprise a video display 810 (e.g., a liquid crystal display (LCD), a touch screen, or a cathode ray tube (CRT)), an alphanumeric input device 812 (e.g., a keyboard), a cursor control device 814 (e.g., a mouse), and an acoustic signal generation device 816 (e.g., a speaker).

Data storage device 818 can include a computer-readable storage medium (or, more specifically, a non-transitory computer-readable storage medium) 828 on which is stored one or more sets of executable instructions 822. In accordance with one or more aspects of the present disclosure, executable instructions 822 can comprise executable instructions performing method 500 of method of blind spot mitigation during autonomous trucking missions by an ADT, method 600 of an expansion of a field of view of an autonomously driven truck that uses cooperation with another vehicle or a stationary sensing system, and method 700 of vehicle shielding of autonomously driven trucks in unfavorable driving conditions.

Executable instructions 822 can also reside, completely or at least partially, within main memory 804 and/or within processing device 802 during execution thereof by example computer device 800, main memory 804 and processing device 802 also constituting computer-readable storage media. Executable instructions 822 can further be transmitted or received over a network via network interface device 808.

While the computer-readable storage medium 828 is shown in FIG. 8 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method to operate a traveling autonomous vehicle (AV), the method comprising:

shifting, using an AV control system, the AV in a first direction that is lateral to a direction of motion of the AV and exposing a first portion of an occluded, by a body of the AV, region of an environment of the AV to a first sensor of a sensing system of the AV;

receiving, by a data processing system of the AV, sensing data from the sensing system, wherein the sensing data comprises a first part obtained using the first sensor and imaging the first portion of the occluded region;

establishing, by the data processing system of the AV and using the received sensing data, an existence of a driving condition, wherein the driving condition comprises one of:

a presence of a vehicle within the occluded region of the environment of the AV, or an absence of a vehicle within the occluded region of the environment of the AV; and causing, by the data processing system of the AV, a driving path of the AV to be determined in view of the established driving condition.

2. The method of claim 1, further comprising:

shifting, using the AV control system, the AV in a second direction that is opposite to the first direction and exposing a second portion of the occluded region of the environment of the AV to a second sensor of the sensing system of the AV, wherein the sensing data further comprises a second part obtained using the second sensor and imaging the second portion of the occluded region.

3. The method of claim 2, wherein each of the first sensor and the second sensor comprises one or more of a camera sensor, a lidar sensor, or a radar sensor.

4. The method of claim 2, wherein shifting the AV in the first direction and in the second direction is performed periodically with a predetermined period.

5. The method of claim 1, wherein shifting the AV in the first direction is responsive to the AV traveling on a curved roadway, wherein the first direction is in a radial outward direction of the curved roadway.

6. The method of claim 1, wherein shifting the AV in the first direction is contingent on an absence of a vehicle, within a predetermined distance, in a lane that is adjacent to a lane of travel of the AV.

7. The method of claim 1, wherein shifting the AV in the first direction is contingent on mapping data being consistent with forward-sensing data obtained by one or more forward-sensing sensors of the sensing system of the AV.

8. The method of claim 1, wherein the AV is shifted in the first direction over a predetermined portion of a lane of travel of the AV.

9. The method of claim 1, wherein the AV is shifted in the first direction until a portion of the AV is in a lane adjacent to a lane of travel of the AV, wherein the lane adjacent to the lane of travel of the AV and the lane of travel of the AV have a same direction of travel.

10. An autonomous vehicle (AV), comprising:

an AV sensing system;

an AV control system to shift the AV in a first direction that is lateral to a direction of motion of the AV and expose a first portion of an occluded, by a body of the AV, region of an environment of the AV to a first sensor of the AV sensing system; and an AV data processing system to:

receive sensing data from the AV sensing system, wherein the sensing data comprises a first part obtained using the first sensor and imaging the first portion of the occluded region;

determine, using the received sensing data, an existence of a driving condition, wherein the driving condition comprises one of:

a presence of a vehicle within the occluded region of the environment of the AV, or an absence of a vehicle within the occluded region of the environment of the AV; and cause the AV data processing system to determine a driving path of the AV in view of the determined driving condition.

11. The autonomous vehicle of claim 10, wherein the AV control system is further to shift the AV in a second direction that is opposite to the first direction and expose a second portion of the occluded region of the environment of the AV to a second sensor of the AV sensing system, and wherein the sensing data further comprises a second part obtained using the second sensor and imaging the second portion of the occluded region.

12. The autonomous vehicle of claim 11, wherein each of the first sensor and the second sensor comprises one or more of a camera sensor, a lidar sensor, or a radar sensor.

13. The autonomous vehicle of claim 11, wherein shifting the AV in the first direction and in the second direction is performed periodically with a predetermined period.

14. The autonomous vehicle of claim 10, wherein shifting the AV in the first direction is responsive to the AV traveling on a curved roadway, wherein the first direction is in a radial outward direction of the curved roadway.

15. The autonomous vehicle of claim 10, wherein the AV control system is to shift the AV in the first direction responsive to an absence of a vehicle, within a predetermined distance, in a lane that is adjacent to a lane of travel of the AV.

16. The autonomous vehicle of claim 10, wherein the AV control system is to shift the AV in the first direction responsive to mapping data being consistent with forward-sensing data obtained by one or more forward-sensing sensors of the AV sensing system.

17. The autonomous vehicle of claim 10, wherein the AV control system is to shift the AV in the first direction over a predetermined portion of a lane of travel of the AV.

18. The autonomous vehicle of claim 10, wherein the AV control system is to shift the AV in the first direction until a portion of the AV is in a lane adjacent to a lane of travel of the AV, wherein the lane adjacent to the lane of travel of the AV and the lane of travel of the AV have a same direction of travel.

19. A system comprising:

a memory device; and a processing device communicatively coupled to the memory device, the processing device configured to:

cause a control system of an autonomous vehicle (AV) to shift the AV in a direction that is lateral to a direction of motion of the AV and expose a portion of an occluded, by a body of the AV, region of an environment of the AV to a sensor of a sensing system of the AV;

receive, from a data processing system of the AV, sensing data, wherein the sensing data comprises data imaging the portion of the occluded region;

determine, by the data processing system of the AV and using the received sensing data, an existence of a driving condition, wherein the driving condition comprises one of:

a presence of a vehicle within the occluded region of the environment of the AV, or an absence of a vehicle within the occluded region of the environment of the AV; and cause, by the data processing system of the AV, a driving path of the AV to be determined in view of the determined driving condition.

20. The system of claim 19, wherein the processing device is to cause the control system of the AV to shift the AV in the lateral direction responsive to at least one of:

passage of a predetermined time, or the AV traveling on a curved roadway, wherein the lateral direction is in a radial outward direction of the curved roadway.

* * * * *